US010762540B1

(12) United States Patent
Price et al.

(10) Patent No.: US 10,762,540 B1
(45) Date of Patent: Sep. 1, 2020

(54) SYSTEMS AND METHODS FOR AUTOMATED TRADE-IN WITH LIMITED HUMAN INTERACTION

(71) Applicant: Capital One Services, LLC, McLean, VA (US)

(72) Inventors: Micah Price, Plano, TX (US); Avid Ghamsari, Frisco, TX (US); Geoffrey Dagley, McKinney, TX (US); Qiaochu Tang, The Colony, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/659,809

(22) Filed: Oct. 22, 2019

(51) Int. Cl.
*G06N 20/00* (2019.01)
*G06Q 30/02* (2012.01)
*G06T 7/70* (2017.01)
*G06K 9/46* (2006.01)
*G06K 9/00* (2006.01)
*G06K 9/62* (2006.01)
*G06T 7/00* (2017.01)

(52) U.S. Cl.
CPC ..... *G06Q 30/0278* (2013.01); *G06K 9/00624* (2013.01); *G06K 9/46* (2013.01); *G06K 9/6267* (2013.01); *G06N 20/00* (2019.01); *G06Q 30/0206* (2013.01); *G06T 7/70* (2017.01); *G06T 7/97* (2017.01); *G06T 2207/10016* (2013.01); *G06T 2207/30248* (2013.01)

(58) Field of Classification Search
CPC ................ G06F 17/00; G06Q 30/0278; G06Q 30/0206; G06T 7/97; G06T 7/70; G06T 2207/10016; G06T 2207/30248; G06N 20/00; G06K 9/00624; G06K 9/46; G06K 9/6207
USPC .......................................... 701/29.6, 59, 100
See application file for complete search history.

(56) References Cited

U.S. PATENT DOCUMENTS

| 6,898,493 B2 | 5/2005 | Ehrman et al. |
| 8,912,883 B2 | 12/2014 | Kobres |
| 9,953,412 B1 | 4/2018 | Anderson et al. |

(Continued)

OTHER PUBLICATIONS

U.S. Appl. No. 16/660,001, Systems and Methods for Automated Vehicle Tracking for Readiness with Limited Human Interaction, filed Oct. 22, 2019.

*Primary Examiner* — Tuan C To
(74) *Attorney, Agent, or Firm* — Banner & Witcoff, Ltd.

(57) ABSTRACT

Aspects described herein may facilitate an automated trade-in of a vehicle with limited human interaction. A server may receive a request to begin a value determination of a vehicle associated with the user. The server may receive first data comprising: vehicle-specific identifying information, and multimedia content showing a first aspect of the vehicle. The user may be directed to place the vehicle within a predetermined staging area. The server may receive, from one or more image sensors associated with the staging area, second data comprising multimedia content showing a second aspect of the vehicle. The server may create a feature vector comprising the first data and the second data. The feature vector may be inputted into a machine learning algorithm corresponding to the vehicle-specific identifying information of the vehicle. Based on the machine learning algorithm, the server may determine a value of the vehicle.

20 Claims, 8 Drawing Sheets

(56) References Cited

U.S. PATENT DOCUMENTS

| | | |
|---|---|---|
| 10,319,094 B1 | 6/2019 | Chen et al. |
| 2005/0171896 A1* | 8/2005 | Seretti .................. G06Q 30/06 705/37 |
| 2008/0183535 A1 | 7/2008 | Kahana |
| 2008/0195428 A1* | 8/2008 | O'Sullivan ...... G06Q 10/06311 705/6 |
| 2013/0218636 A1* | 8/2013 | Colson ............... G06Q 30/0206 705/7.31 |
| 2014/0214696 A1* | 7/2014 | Laughlin ........... G06Q 30/0278 705/306 |
| 2014/0229311 A1* | 8/2014 | Colson ................. G06Q 30/02 705/26.2 |
| 2015/0032580 A1 | 1/2015 | Altermatt et al. |
| 2015/0039466 A1 | 2/2015 | Skinner et al. |
| 2015/0100504 A1* | 4/2015 | Binion ............... G06Q 30/0278 705/306 |
| 2015/0287130 A1 | 10/2015 | Vercollone et al. |
| 2015/0348142 A1* | 12/2015 | Endras ............... G06Q 30/0278 705/306 |
| 2017/0069092 A1* | 3/2017 | Bell ...................... G05D 1/0246 |
| 2017/0098183 A1* | 4/2017 | Brockman ..... G06Q 10/063114 |
| 2018/0012350 A1 | 1/2018 | Gangitano et al. |
| 2019/0068713 A1* | 2/2019 | Maletych ............... H04L 67/12 |
| 2019/0095877 A1 | 3/2019 | Li |
| 2019/0174071 A1 | 6/2019 | Wasner |
| 2019/0204423 A1* | 7/2019 | O'Keeffe ................ G01S 17/42 |
| 2019/0340746 A1* | 11/2019 | Lu ........................... G06F 17/18 |
| 2019/0347809 A1* | 11/2019 | Sato ..................... G06K 9/6201 |
| 2019/0371167 A1* | 12/2019 | Min ........................ G08G 1/08 |
| 2019/0391233 A1* | 12/2019 | Park ..................... H01Q 1/3233 |
| 2020/0041275 A1* | 2/2020 | Sagalovich ............ G01C 21/32 |
| 2020/0062249 A1* | 2/2020 | Light ...................... G07C 5/008 |
| 2020/0070631 A1* | 3/2020 | Hebling ................. B60R 25/31 |
| 2020/0073969 A1* | 3/2020 | Kursar ................ G06F 16/7867 |
| 2020/0074222 A1* | 3/2020 | Guo ..................... G06K 9/6267 |
| 2020/0074226 A1* | 3/2020 | Oe ...................... G06K 9/00791 |

* cited by examiner

SYSTEMS AND METHODS FOR AUTOMATED TRADE-IN WITH LIMITED HUMAN INTERACTION

FIELD OF USE

Aspects of the disclosure relate generally to electronic devices. More specifically, aspects of the disclosure may provide for systems and methods for automated trade-in of vehicles with limited human interaction.

BACKGROUND

Auto dealerships today may physically deploy personnel to inspect vehicles for various purposes. For example, some dealerships may determine the trade-in value of a vehicle by having personnel make a quick inspection of the vehicle for damages. Additionally, when customers request to test-drive, rent, or lease a vehicle, dealership personnel may inspect the vehicle before and after the vehicle, e.g., to ensure that the vehicle was returned in the same condition.

Having personnel to inspect vehicles in such manner may add to the bottom line costs for auto dealerships. Furthermore, having to deal with auto dealership personnel may affect the experience of customers. Systems and methods are needed to overcome one or more of the shortcomings presented above.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow a vehicle user to automatically trade-in a vehicle (e.g., at a dealership, vehicle shop, or lot) in a manner that limits unnecessary human interaction. By way of introduction at a high level, a user may use a mobile device to send a request to begin an automated trade-in of a vehicle associated with the user ("user vehicle"). The request may be sent to a server that manages such requests. The user may be instructed to submit information about the vehicle along with photos and other multimedia content covering one or more aspects of the user vehicle. The information can be entered into, and/or the multimedia content can be uploaded to, a mobile application running on the mobile device and managed by the server. Based on these submissions, the server may deliver an initial estimate of the value of the user vehicle. The user may be directed via the mobile device to place the user vehicle into a staging area. The staging area may comprise a predetermined area where one or more image sensors detect the user vehicle, and one or more cameras and other instruments can obtain and send further photos and other multimedia content regarding one or more aspects of the user vehicle. Based on the multimedia content received from the staging area, the server may automatically determine a trade-in value for the user vehicle. In one or more aspects, the server may utilize machine learning models that learn from reference data (e.g., photos of various aspects of other vehicles and the actual values of the vehicles) to determine the trade-in value of the user vehicle. Also or alternatively, the determination of the trade-in value may be based on an adjustment of the initial estimated value of the vehicle.

These and other aspects of the present disclosure may provide various benefits to the auto dealers, prospective customers, and the vehicle industry. For example, systems and methods that facilitate a user to automatically receive a trade-in value of the user vehicle without an employee being present may allow auto dealers to cut costs and unnecessary time and labor. Furthermore, these systems and methods may enhance a user's experience by allowing the user to receive an objective assessment of the vehicle, e.g., based on machine learning, without having to deal with biases or other subjectivity presented by an auto dealer appraising a vehicle.

According to some aspects, these and other benefits may be achieved by a staging area system comprising a predetermined area that detects the presence or entry of a vehicle (e.g., via an image sensor), and generates and sends various multimedia content of specific aspects of the vehicle (e.g., exterior body, under the vehicle, interior, etc.). The multimedia content generators may be enhanced by illumination that is dependent on or calibrated by sunlight intensity or the time of the day. A computing system or server may facilitate the automated trade-in of vehicles with limited human interaction. For example, a server may receive, from a mobile device of a user, a request to begin a value determination of a vehicle associated with associated with the user. The server may prompt the mobile device, e.g., via a mobile application, to send data ("first data") comprising: vehicle-specific identifying information, and multimedia content showing one or more aspects ("first aspect") of the vehicle associated with a user. The server may thus receive this first data. The user may be directed to place the vehicle associated with the user within a predetermined area (e.g., staging area) associated with a second computing device (e.g., a staging area system). Based on a feedback received from one or more image sensors of the second computing device, the server may determine that the vehicle associated with the user is or has been placed within the predetermined area. The server may receive, from the one or more image sensors, second data comprising multimedia content showing a second aspect of the vehicle. The second data comprising the multimedia content may be generated by one or more instruments (e.g., cameras) associated with the second computing device. The server may create a feature vector comprising the first data and the second data. The feature vector may be inputted into a machine learning algorithm corresponding to the vehicle-specific identifying information of the vehicle. Based on the machine learning algorithm, the server may determine a value of the vehicle.

Corresponding methods, apparatuses, systems, and computer-readable media are also within the scope of the disclosure.

Further aspects discussed herein may provide a computer-implemented method for facilitating automated vehicle tracking for readiness with limited human interaction. The method may utilize sensors and other instruments in staging areas to generate multimedia content that captures the condition of a vehicle before and after a test drive, a rental use, or a lease. The conditions may be compared and analyzed to track the readiness of a vehicle (e.g., without the need for an in-person mechanic and/or dealer). Vehicles may be deemed to not be ready for another test-drive, another rental use, or another lease if their condition has deteriorated.

For example, a server may receive vehicle-specific identifying information of a vehicle requested for a test-drive, rental use, or lease by a user. The user may be prompted to place the vehicle within a predetermined area (e.g., staging area) associated with a second device (e.g., staging area system). The vehicle may enter the predetermined area, e.g., for a first inspection, before beginning the test drive, the rental use, or the lease. One or more image sensors of the second device may detect the vehicle, and the server may authenticate the vehicle using the vehicle-specific identifying information. The server may send a permission to the second device to capture a first set of multimedia content showing one or more aspects of the vehicle. Thereafter, the server may receive, from the second device, the first set of multimedia content showing the one or more aspects of the vehicle, and a time of generation of the first set of multimedia content.

It is contemplated that after the second device sends the first set of multimedia content, the user may begin test-driving or otherwise using the vehicle, e.g., driving the vehicle in order to assess the vehicle for possibly buying, renting, or otherwise leasing the vehicle. The user may be prompted to return the vehicle after the test drive, rental use, or lease, to the same or another predetermined area associated with the second device. The user may be prompted through a mobile application of the user's mobile device. After the user returns the vehicle to the predetermined area, one or more image sensors of the second device may detect that the vehicle is entering the predetermined area to end the test drive, rental use, or lease. The server may receive, from the second device (e.g., via its one or more image sensors), a second set of multimedia content showing the one or more aspects of the vehicle, and a time of generation of the second set of multimedia content. Furthermore, the server may analyze the first set of multimedia content and the second set of multimedia content to determine differences in the one or more aspects of the vehicle. For example, the analyzing may comprise: creating a first input vector comprising a first image data of the first set of multimedia content and a second input vector comprising a second image data of the second set of multimedia content; applying a first weight to the first input vector and a second weight to the second input vector; generating, based on an artificial neural network, an output vector to indicate an indicia of similarity between the first set of multimedia content and the second set of multimedia content; and generating, based on the indicia of similarity, an assessment of the vehicle. The server may determine whether the generated assessment fails to satisfy a predetermined threshold. If the generated assessment fails to satisfy the predetermined threshold, the server may generate an indication prompting attention to the vehicle.

Also or alternatively, the first set of multimedia content may be generated before a user rents or leases a vehicle, and the second set of multimedia content may be generated after the user returns the rented or leased vehicle. Thus, for any of the aspects described herein, the test drive may be replaced with a rental or lease period of the vehicle. For example, a user may take the vehicle to a predetermined area for multimedia content generation to before renting the vehicle, and then come back to a predetermined area for multimedia content generation when returning the rented vehicle.

Corresponding methods, apparatuses, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
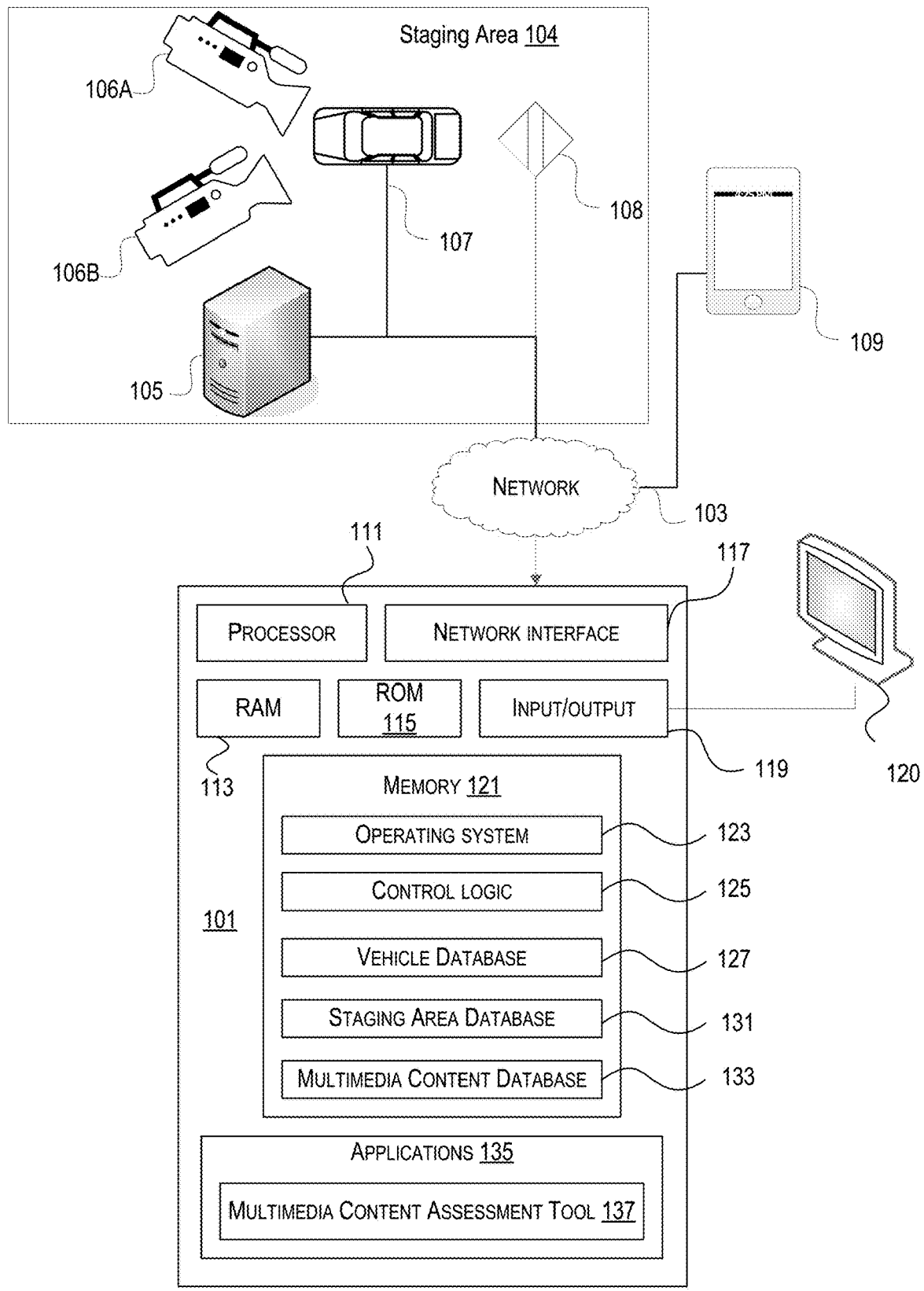
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for automatically determining the trade-in value of a vehicle with limited human interaction. For example, a staging area system may comprise one or more instruments for generating content pertaining to a vehicle and sending such content to a computing system or server. The staging area system may be associated with a staging area where the vehicle may be placed. The server may communicate with a mobile device of the user and the staging area system. The server may rely on a library, database, or external systems for training data from reference vehicles in order to learn and generate algorithms for accurately determining a trade-in value of a vehicle. The server may receive requests from, prompt instructions to, and deliver automated trade-in determinations to a mobile device of the user. The mobile device may display information or receive input via a user interface of a mobile application using one or more methods. The server, staging area system, and/or mobile device may be examples of one or more computing devices. As discussed further herein, this combination of features may allow the automatic determination of a trade-in value of a vehicle with limited human interaction. As will be described further herein, FIGS. 4A-4B describe methods performed by the server for automatically determining the trade-in value of a vehicle with limited human interaction, while FIG. 5 describes a method performed by the staging area system for facilitating the automatic determination of the trade-in value of the vehicle.

By way of introduction, further aspects discussed herein may relate to systems, methods, techniques, apparatuses, and non-transitory computer readable media for automated vehicle tracking for readiness (e.g., for a test-drive, rental use, or lease) with limited human interaction. The server may receive a signal that a vehicle is requested, e.g., for a test-drive, a rental use, a lease, etc. The signal may be received from a mobile device of a user or from the staging area system. The server may prompt a user (e.g., via the mobile device) to place the vehicle in a staging area of the staging area system prior to the test drive, rental use, or lease. Instruments at or near the staging area may generate a first set of multimedia content of one or more aspects of the vehicle. The server may receive the first set of multimedia content. After the test-drive, rental use, or lease, the user may be prompted to return the vehicle to a staging area of the staging area system. A second set of multimedia content of the one or more aspects of the vehicle may be generated by instruments at or near the staging area, and may be sent to the server. The server may compare the first set of multimedia content and second set of multimedia content, and generate an indicia of similarity based on the comparison. The server may rely on a library, database, or external systems for training data from reference vehicles to determine an appropriate indicia of similarity among multimedia content. Furthermore, the server may utilize algorithms for spotting differences in multimedia content (e.g., images). The server may prompt attention to the vehicle if the indicia of similarity fails to meet a predetermined threshold. The server, staging area system, and/or mobile device may be examples of one or more computing devices. As discussed further herein, this combination of features may allow the automated vehicle tracking for readiness of a vehicle (e.g., for test-drive, rental use, lease, etc.). As will be described further herein, FIG. 6 describes a method performed by the server for tracking a vehicle and assessing the readiness of the vehicle, while FIG. 7 describes a method performed by the staging area system for facilitating the automated vehicle tracking for readiness with limited human interaction.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a laptop computer, a tablet computer, a smart phone, any other types of mobile computing devices, and the like). Furthermore, the computing device 101 may be a computing system located near a staging area (e.g., the staging area system) and/or any other type of data processing device.

Computing device 101 may, in some embodiments, operate in a standalone environment. In others, computing device 101 may operate in a networked environment. As shown in FIG. 1, various devices 101, 105, 106A-106B, 107, 108, and 109 may be interconnected via a network 103, such as the Internet. Other networks may also or alternatively be used, including private intranets, corporate networks, LANs, wireless networks, Bluetooth networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 106A-106B, 107, 108, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations for determining initial or final estimates of a trade-in value of a vehicle, training a machine learning algorithm based on training data comprising vehicle-specific information, multimedia content, and market or trade-in values of a plurality of reference vehicles; tracking the placement of a vehicle within a staging area; and managing information received from the mobile device and the staging area systems, and other functions. In some aspects, processor 111 may be adapted to perform computations for authorizing, instructing, or directing external computing systems (e.g., sensors, devices, and other instruments associated with a staging area) to generate multimedia content, managing and facilitating a mobile application for test-driving, and analyzing multimedia content capturing one or more aspects of a vehicle at disparate times, and tracking the readiness of vehicles (e.g., for a test-drive, rental use, lease, etc.). I/O 119 may include a variety of interface units and drives for reading, writing, displaying, and/or printing data or files. I/O 119 may be coupled with a display such as display 120. In some aspects, I/O 119 may be used to display information (e.g., instructions, staging area directions or locations, automated trade-in values, readiness assessments and scores, etc.) on a mobile application of the mobile device 109. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use, for example, vehicle database 127, staging area database 131, and multimedia content database 133 may be stored in a memory of a computing device used at a server system that will be described further below. Control logic 125 may be incorporated in and/or may comprise a linking engine that updates, receives, and/or associates various information stored in the memory 121 (e.g., multimedia content metadata, vehicle identifiers, staging area identifiers, etc.). In other embodiments, computing device 101 may include two or more of any and/or all of these components (e.g., two or more processors, two or more memories, etc.) and/or other components and/or subsystems not illustrated here.

Device 101 (or device 105, 106A-106B, 107, 108, 109) may further comprise one or more applications, software, plug-ins, programs, or code ("applications" 135), which may be used to perform one or more methods or steps described herein. In some aspects, a device 101 (e.g., a server) may comprise an application program interface or an application server to manage, host, or facilitate applications 135 running on other devices (e.g., device 105, 106A-106B, 107, 108, or 109). For simplicity, application 135 may also be used to refer to said application server or application program interface. For example, device 101 may include a multimedia content assessment tool 137 which may comprise an application, software, plug-in, program, and/or code to assess multimedia content received and/or uploaded by various devices.

Devices 105, 107, 109 may have similar or different architecture as described with respect to computing device 101. Those of skill in the art will appreciate that the functionality of computing device 101 (or device 105, 106A-106B, 107, 108, 109) as described herein may be spread across multiple data processing devices, for example, to distribute processing load across multiple computers, to segregate transactions based on geographic location, user access level, quality of service (QoS), etc. For example, devices 101, 105, 106A-106B, 107, 108, 109, and others may operate in concert to provide parallel computing features in support of the operation of control logic 125 and/or applications 135.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for automated trade-in of vehicles with limited human interaction.

Figure 2:
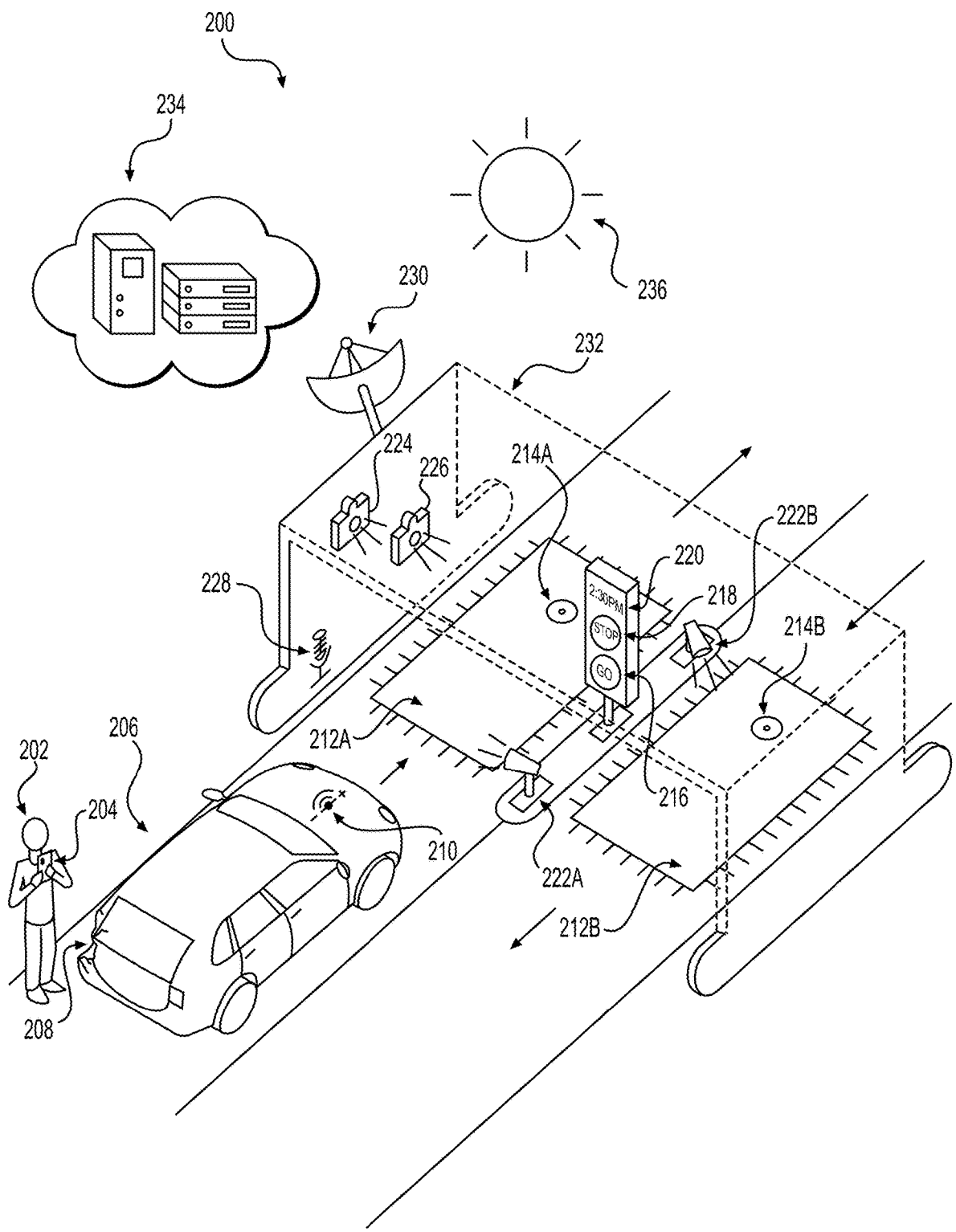
FIG. 2 depicts an example environment in accordance with one or more illustrative aspects discussed herein.

FIG. 2 depicts an example environment 200 in accordance with one or more illustrative aspects discussed herein. In at least one aspect, a user 202, via a mobile device 204, may be able to automatically receive a trade-in value for a vehicle associated with the user ("user vehicle" 206) with minimal human interaction. For example, the user 202 may send a request for automated trade-in value determination for the user vehicle 206 via the mobile device 204. In various embodiments, "trade-in value" may be used to refer to a monetary or economic value of a vehicle e.g., for the purpose of selling or returning the vehicle. The request may be inputted into an application running on mobile device 204 and may be sent to a remote or local server 234. The user 202 may be given instructions to enter or upload various information about the user vehicle 206 that could be used to determine the trade-in value of make an initial estimate of the trade-in value. For example, the user may be prompted to enter in information identifying the user vehicle ("vehicle-specific information") on a mobile application running on the mobile device 204 of the user 202. Further, the user may be prompted to upload photos (or other forms of multimedia content) of one or more aspects of the vehicle 206. As shown in FIG. 2, the user vehicle 206 may not necessarily be in its best condition. For example, the user vehicle 206 may show wear and tear or damage 208 that can affect the trade-in value of the vehicle 206. Thus, the user may upload photos of the damaged portion 208 of the user vehicle 206 to obtain a realistic trade-in value. The server 234 may receive the vehicle-specific information and the multimedia content from the mobile device 204 via a wireless and/or cellular network.

The server may instruct the user (via mobile device 204) to place the user vehicle 206 within a staging area 212A. In various embodiments, a "staging area" may be used to refer to a predetermined area for the placement of a vehicle where instruments associated with the staging area can automatically generate content concerning various aspects of the vehicle. For example, as shown in FIG. 2, staging areas 212A and 212B are predetermined areas for a vehicle can be placed so that various instruments (e.g., cameras 224 and 226, sound recorders 228, etc.) can be better poised at obtaining data (e.g., photos, videos, recordings, etc.) of the vehicle. This content may be delivered to the server 234 over a network. For example, a communications module 230 near the staging area may facilitate the communication between the server 234 and the various devices associated with the staging area. As will be described further, the various instruments, devices, and/or computing systems associated with a staging area can be referred to collectively as "staging area system" for simplicity. Also or alternatively, "staging area system" may be used to refer to a central device or computing system 220 that received data obtained from the various instruments. In some implementations, the server 234 may prompt the staging area system to signal a user 202 to place the user vehicle 206 into a staging area 212A. The signaling may be via traffic indicators, e.g., "Go" 216 and "Stop" 218, as shown in FIG. 2. In some aspects the staging area system detects the placement or presence of a vehicle 206 via image sensors 214A and 214B. Through this detection the staging area system may deliver a feedback to the server 234 that a vehicle has entered the staging area 214A. Also or alternatively, one or more cameras 224 and 226 can generate multimedia content (e.g., photos, videos, etc.) of the incoming or placed vehicle 206 and the multimedia content can be used to authenticate the vehicle. Furthermore, the cameras 224 and 226 may be used to generate further multimedia content of one or more aspects of the user vehicle 206. In some implementations, the cameras 224 and 226, and/or image sensors 214A-214B may be aided by illumination provided by light sources (e.g., lamps 222A-

222B). The light sources may be periodically adjusted or calibrated based on the level of sunlight 236. The adjustment or calibration can help ensure that the multimedia content generated by the staging area system remains consistent, regardless of the time of day. Furthermore, the staging area may be covered 232, e.g., to further maintain this consistency of generated educational content so that the trade-in value of vehicles can be accurately determined. In some aspects, the server 234 may also receive data from the user vehicle 206 via its telematics system 210. The data received from the telematics system 210 may be indicative of the vehicle's trade-in value and may thus be used in the automated determination.

In at least another illustrative aspect, a server may track the readiness of a plurality of vehicles (e.g., vehicle 206), for example, to provide a better experience for users 202 who would like to test drive a vehicle 206, and/or to inform auto dealers of the readiness of their vehicles (e.g., for test-driving, rental use, leasing, etc.). A user 202 seeking to test-drive, rent, and/or lease a vehicle 208 may be guided by a mobile application running on the user's mobile device 204 to take the vehicle 206 to a first staging area 212A before proceeding to use the vehicle in the requested capacity. Traffic signals 216 and 218 may further assist the user 202 in the placement of the vehicle 206 onto the first staging area 212A. There, an image sensor 214A of the first staging area 212A may detect the vehicle 206 and send feedback to the server 234. The server 234, after authenticating the vehicle 206, may direct various instruments of the staging area system 220 (e.g., cameras 224 and 226, audio recorders 228, image sensors 214A, etc.) to capture the conditions of one or more aspects of the vehicle through various multimedia content (e.g., image, video, audio, readings, etc.) before the test-drive, rental use, or leasing period. In some aspects, the server 234 or the staging area system 220 may also communicate with the telematics system 210 of the vehicle and obtain data indicating the condition of one or more aspects of the vehicle 206. The staging area system 220 may send the multimedia content (i.e., first multimedia content) capturing the conditions of the one or more aspects of the vehicle 206 to the server 234 via communications module 230. The user 202 may proceed to test-drive the vehicle 206 or initiate the rental use or lease of the vehicle 206. The user 202 may be reminded, e.g., via mobile application 204, to return the vehicle 206 after the test-drive, rental use period, or lease period to a staging area 212B (i.e., second staging area). After detection of the vehicle 206, e.g., via image sensor 214B, the server 234 may again authenticate the vehicle 206. Furthermore, the server 234 may again authorize or instruct various instruments of the staging area system 220 to generate multimedia content (i.e., second multimedia content) capturing the conditions of the one or more aspects of the vehicle after the test-drive, rental use, or lease. The second multimedia content may also be sent to the server 234 via communications module 230. The server 234 may analyze the first multimedia content, the second multimedia content, and their respective metadata to generate an assessment of the readiness of the vehicle 206. In at least one aspect, the assessment may be based on a machine learning model that compares the image data of the first multimedia content to the second multimedia content to determine a indicia of similarity.

Figure 3:
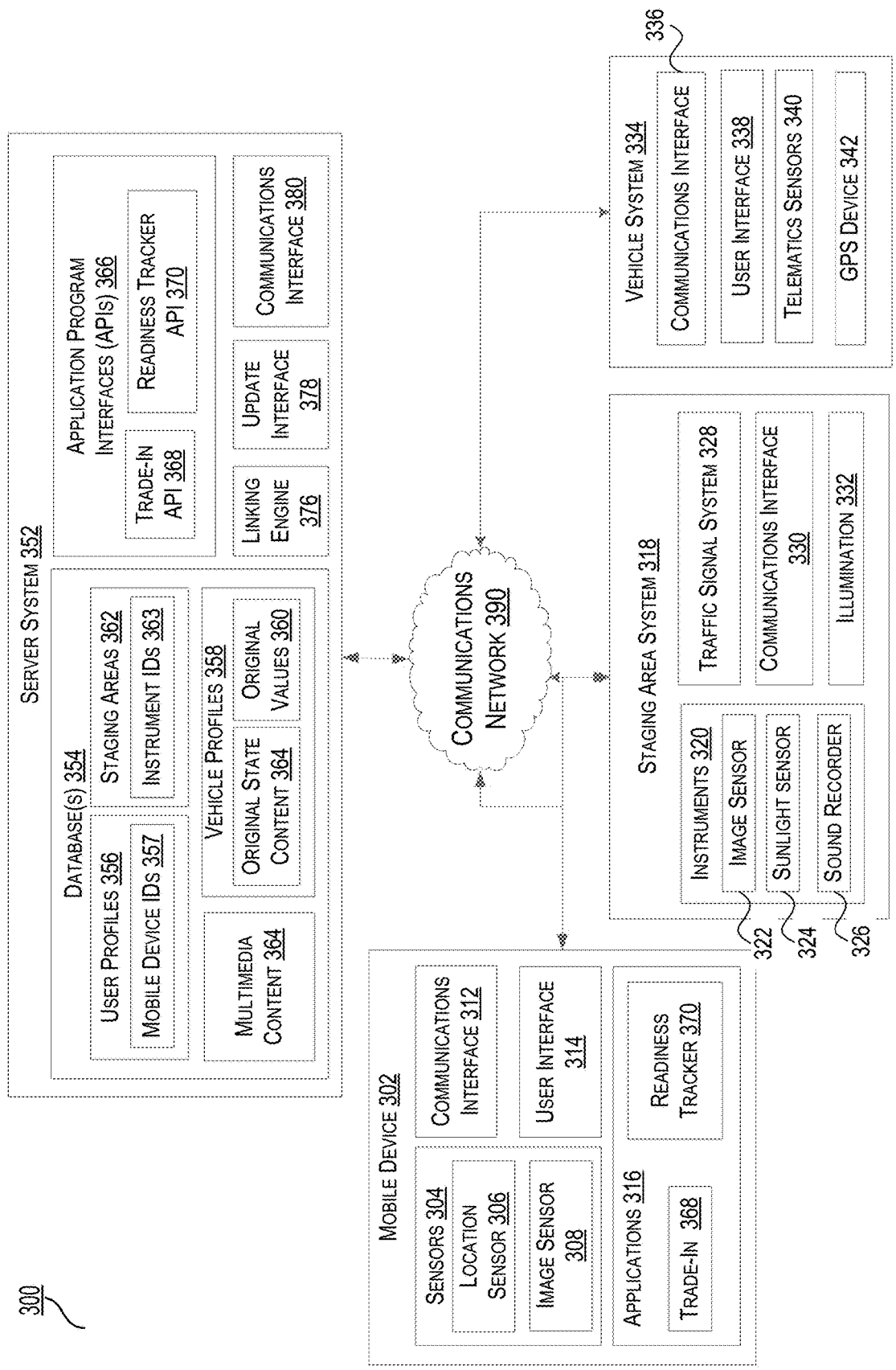
FIG. 3 depicts an example network in accordance with one or more illustrative aspects discussed herein.

FIG. 3 depicts an example network 300 in accordance with one or more illustrative aspects discussed herein. Each component or subcomponent shown in FIG. 3 may be implemented in hardware, software, or a combination of the two. Additionally, each component or subcomponent may include a computing device (or system) having some or all of the structural components described above for computing device 101. At a high level, the network 300 may include, for example, one or more mobile devices (e.g., mobile device 302), one or more staging area systems (e.g., staging area system 318), one or more vehicle systems (e.g., vehicle system 334), and one or more server systems (e.g., server system 352). The mobile device 302 (e.g., a user device) may comprise a mobile phone (e.g., a smartphone), personal computer, tablet computer, laptop, or the like, which may include at least some of the features described herein. The mobile device 302 may belong to a user seeking to utilize systems and methods described herein, and may be used to send requests to and/or receive notifications from server system 352, e.g., via an application and/or program hosted, managed, and/or otherwise controlled by the server system 352. For example, the mobile device 302 may be used to request an automated determination of a trade-in value of a vehicle; upload multimedia content; enter relevant vehicle-specific information; and view notifications, calculations, and assessments and status updates. The mobile device 302 may be a computing device distinct from the staging area system 318, vehicle system 334, or the server system 352.

According to some aspects of the disclosure described herein, the mobile device 302 may comprise one or more components or features described below. Through a communications interface 312, the mobile device may be able to form wired and/or wireless data connections with other computing systems and devices, such as the one or more components of the staging area system 318, the vehicle 334, and the server system 352 (e.g., as described further below) via an internet and/or other telecommunications network (e.g., communications network 390). The mobile device 302 may include various sensors 304 configured to capture physical data (e.g., images, videos, or sounds pertaining to the user vehicle); collect locational, geographical, and/or movement information; and/or transmit data. For example, the mobile device 302 may comprise a built-in or connected image sensor 308 (e.g., a camera) that may generate multimedia content (e.g., image and/or video data). A user may operate image sensor 308 to capture image and/or video data for specific aspects of a vehicle. These aspects may be requested by the server via the mobile application (e.g., "Please take a photo of your vehicle's dashboard"). In some implementations, the mobile application may provide an area or an overlaid diagram on a camera field of view for the user to generate a photo accordingly. Also or alternatively, the generated multimedia content may be voluntarily submitted by the user and the aspect of the vehicle being captured may be indicated or selected by the user. Generated multimedia content may also include metadata indicating the time, date, and/or location of the generation. The metadata may be saved in a memory and may also be received by the server system 352. Furthermore, the sensors 304 may include a location sensor 306 (e.g., global positioning system (GPS)) to determine a location of the mobile device. For example, based on the location of the mobile device 302 detected by the location sensor 306, the server system 352 may prompt the user to place the user vehicle to a staging area that is nearest. Other types of sensors may also be downloaded as applications 316. The mobile device 302 may also store user-specific identifying information within its memory (not shown), which can be accessed by or sent to the server 352, e.g., as metadata.

The user interface 314 may be a display coupled with input devices (e.g., keyboard, type pad, touch screen, mouse, buttons, icons, microphone, sensors, etc.) that allows a user to send requests, input information and/or view information. For example, the user interface 314 may allow a user to send a request to the server system 352 to automatically determine the trade-in value of a vehicle. The user interface 314 may then display instructions to the user to enter vehicle-specific information, generate and upload multimedia content, or take the user vehicle to a nearby staging area. The mobile device 302 may also run programs or applications 316 on a user interface 314. One application or program may enable a user to use the systems and methods described herein to receive an automated determination of a trade-in value of a vehicle with limited human interaction. Another application or program may guide the user desiring to test-drive, rent, and/or lease a vehicle to bring the vehicle to staging areas for inspection before and after the period of test-drive, rental use, or lease. The application or program may be provided to the user device or hosted by server 352 (e.g., via an application program interface (API) 366). In some implementations, the mobile device 302 may include one or more subcomponents of computing device 101, shown in FIG. 1.

The staging area system 318 may include one or more devices, computing systems, or sensors at, adjacent to, or associated with a staging area of a vehicle. The staging area system 318 may include one or more of the features and components described below. The staging area system 318 may include various instruments 320 configured to: generate multimedia content that capture physical data of the vehicle parked in a staging area at, adjacent to, or associated with the staging area system 318; collect locational or geographical information (e.g., via location sensor 324); track the entry, exit, and presence of vehicles (e.g., via image sensor 322); calibrate or adjust the conditions for the generation of multimedia content (e.g., via illumination devices 332 and sunlight sensors 324), and/or transmit sensor data. For example, the parking spot system 318 may include a built-in or affixed image sensor 326 (e.g., a motion detector, camera, etc.) that may detect a vehicle, authenticate the vehicle, or generate multimedia content of an aspect of the vehicle (e.g., image and/or video data).

The staging area system 318 may comprise a plurality of electronic instruments 320 and communications interface 330 to establish wireless, wired, or network connections with one or more other systems (e.g., the mobile device 302, the server system 352, the vehicle systems 334, etc.) The electronic instruments 320 may be one or more devices or sensors that generate multimedia content that capture physical data of the vehicle. The physical data may be indicative of a condition of the vehicle and/or may affect the trade-in value of the vehicle. For example, the electronic instruments 320 may include image sensors 322 (e.g., cameras, motion detectors, etc.), and sound recorders 326. The image sensors may be placed at various angles facing the staging area or vehicle, or at various locations near or at the staging area, e.g., to capture different aspects of the vehicle. For example, an image sensor at the base (e.g., ground) of the staging area may be used to generate multimedia content that could show whether the vehicle has any leakage issues. Such an image sensor may also be used to detect the entry, exit, or presence of a vehicle. In another example, an image sensor hovering above the staging area may be used to generate multimedia content that reveal any issues to the top exterior of the vehicle. Sound recorders 326 may be able to capture sound recordings of a vehicle after a user has been instructed to keep the vehicle running or cause the vehicle to perform a prescribed function. The user may be provided the instruction via the mobile application 316 on the mobile device 302 and/or via a display signal provided by the staging area system 318. Furthermore, the electronic instruments 320 may also include a sunlight sensor 324 to aid in the calibration or adjustment of the conditions for generating multimedia content, e.g., by appropriately increasing or decreasing illumination via illumination devices 332.

The staging area system 318 may also include a traffic signal system 328 to guide the user in the placement of the user vehicle or in the performance of various functions. For example, the traffic signal system 328 may include color-based and/or textual displays, e.g., "Go," "Stop," "Slow," to guide the user vehicle to the staging area. These displays may comprise, for example, markers 216 and 218 in FIG. 2. These displays may be triggered based on instructions given to it by the server system 352. Furthermore, the staging area system 318 may provide instructions (e.g., via a display of the traffic signal system 328) to the user to perform functions including, e.g., turning the vehicle on, pressing the gas pedal, activating various lights of the vehicle, activating windshield wipers, activating blinkers, and the like. Through these functions, the staging area system 318 can appropriately gather physical data, e.g., via sound recordings, images, or videos.

The vehicle system 334 may include one or more devices, computing systems, circuitry or sensors that are interior to, exterior to, or otherwise associated with a vehicle. For example, the vehicle system 334 may include telematics system 210, as shown in FIG. 2. The vehicle system 334 may include one or more of the features and components described below, according to some aspects of the present disclosure. For example, the vehicle system 334 may include various sensors 334 configured to capture a state of the vehicle (e.g., telematics sensors 340) or collect locational or geographical information (e.g., GPS device 342). The telematics sensors 340 may compile the data captured by various sensors measuring or assessing the performance of various aspects of the vehicle. The location sensor (e.g., a global positioning service (GPS)) 342 may capture and present a location of the vehicle. The telematics sensors 340 may further include, but are not limited to, an oil filter sensor, an odometer, a fuel tank sensor, a thermometer, a vehicle computer, or a voltage sensor. Vehicle computers may be accessed through an OBD2 port, Bluetooth capabilities, or the like. The vehicle computer may be used to access additional sensors (e.g., tire pressure monitoring systems) or vehicle information (e.g., engine codes). Readings or measurements obtained from these and other telematics sensors may be useful for assessing the trade-in value of a vehicle. Furthermore, readings or measurements obtained from these and other telematics sensors before and after a test-drive, rental use, or lease of a vehicle may be useful in tracking the readiness of the vehicle.

The vehicle 334 may also include a user interface 338 to allow a user to view sensor data (e.g., location, vehicle state or performance, etc.) received from the above-described sensors, or communicate with external systems. The vehicle system 334 may send information to or receive information from other systems (e.g., the mobile device 302, the staging area system 318, the server system 352, etc.) over a network 390, via communications interface 336. The communications interface 336 may comprise a wireless communications interface, such as a cellular connection (e.g., LTE, 5G), a Wi-Fi connection (e.g., Wi-Fi 5 or Wi-Fi 6), or a Bluetooth tether to a mobile device 302. In some implementations, the vehicle system 334 may function as a user device of the user and may perform one or more of the functions described for mobile device 302 (e.g., sending a request to receive an automated determination of a trade-in value).

The server system 352 may comprise one or more remote, local, and/or connected computing systems or servers managing one or more functions of the above-described systems (e.g., the mobile device 302, the staging area system 318, the vehicle system 334, etc.) to facilitate methods and systems described herein. For example, in some implementations, server 352 may be connected to the staging area system 318. At a high level, the server system may comprise one or more databases 354, application program interfaces (APIs) 366, a linking engine 376, an update interface 378, and a communications interface 380. The update interface 378 and linking engine 376 may form a database management application, software, or plug-in that may be used to perform create, read, update, or destroy (CRUD) functions with respect to data stored in the one or more databases 354. For example, the linking engine 376 may be used to form associations or link suitable data from different databases together, and/or to create new data based on associations or linkages. The update interface 378 may be used to update databases (e.g., by adding or deleting) data stored in the one or more databases 354 based on instructions from other parts of the server system 352 (e.g., computer readable instructions stored in memory of an API) or information received from one or more external systems (e.g., the mobile device 302, the staging area system 318, the vehicle systems 334, etc.). The server system 352 may send information to or receive information from the external systems over a communications network 390 via communications interface 336.

The server system 352 may include one or more databases described below. For example, the server system 352 may include a database of user profiles 356, which store identifying or biographical information pertaining to a user or link the user to a user vehicle or mobile device. For example, the user profile may be based on or associated with an identifier of a mobile device of the user (e.g., mobile device ID 357).

The server system 352 may include a database of known staging areas 362, e.g., based on a geographic region. After the server system 352 receives a request for an automated determination of a trade-in value, the server system 352 may use locational information of the mobile device to locate the nearest staging area for a user to drive the user vehicle to. The database of staging areas 362 may store identifiers of parking spots within a predetermined distance from a designated address or location. The address or location may be based on the location of a user, which may be found using a location sensor, e.g., of the mobile device 302 or of the vehicle system 334. Thus, a database of staging areas 362 for the example environment illustrated in FIG. 2 may include identifiers of staging areas 212A-212B. As it is contemplated that staging areas 362 may be associated with various instruments (e.g., sensors, devices, etc.), in some aspects, the database of staging areas 362 may include a database of the various instruments that are identifiable at the staging area (instrument IDs 363).

The server system 352 may include a database of vehicle profiles 358. The vehicle profiles may identify vehicles, e.g., by vehicle identification numbers, license plate numbers, and/or or other vehicle descriptors. In some examples, a vehicle may be identified based on an identifier of its vehicle key (e.g., a vehicle key ID). The list of vehicles may depend on the systems and methods for which the server 352 is being utilized. For example, for a specific identified vehicle, which a user may have been test driven or otherwise used, the vehicle profiles database 358 may store information pertaining to the vehicle's original state (i.e., original state content 364). The stored information may include stored multimedia content (e.g., photos of the vehicle's original state). Also or alternatively, the vehicle profiles 358 may store information pertaining one or more make, model, class, year of manufacture, color, type, or category of a vehicle. For example, the vehicle profiles database 358 may identify vehicles that one or more users seek to determine a trade-in value for based on systems and methods described herein. In some implementations, the server 352 may include a database for the original values 360 of the vehicle.

The sever system 352 may include a database for multimedia content 364, which capture physical data of various aspects of the vehicle. Each multimedia content may include metadata that may reveal the time, data, and/or geographic location of its generation. Furthermore, the database may also indicate the source of the multimedia content (e.g., mobile device 302 of the user or an instrument 320 of the staging area system 318). The multimedia content database 364 may also indicate the aspect of the vehicle that the multimedia content purports to represent. Furthermore, the multimedia content database 364 may also store multimedia content pertaining to a plurality of reference vehicles with known market or trade-in values, e.g., to train machine learning algorithms and other learned or prediction models.

The server system 352 may include one or more APIs described below. The server system 352 may include, e.g., an API for an application for the automated determination of a vehicle's trade-in value (e.g., trade-in API 368), an API for an application for tracking the readiness of a vehicle (e.g., readiness tracker API 370), among others.

Figure 4A:
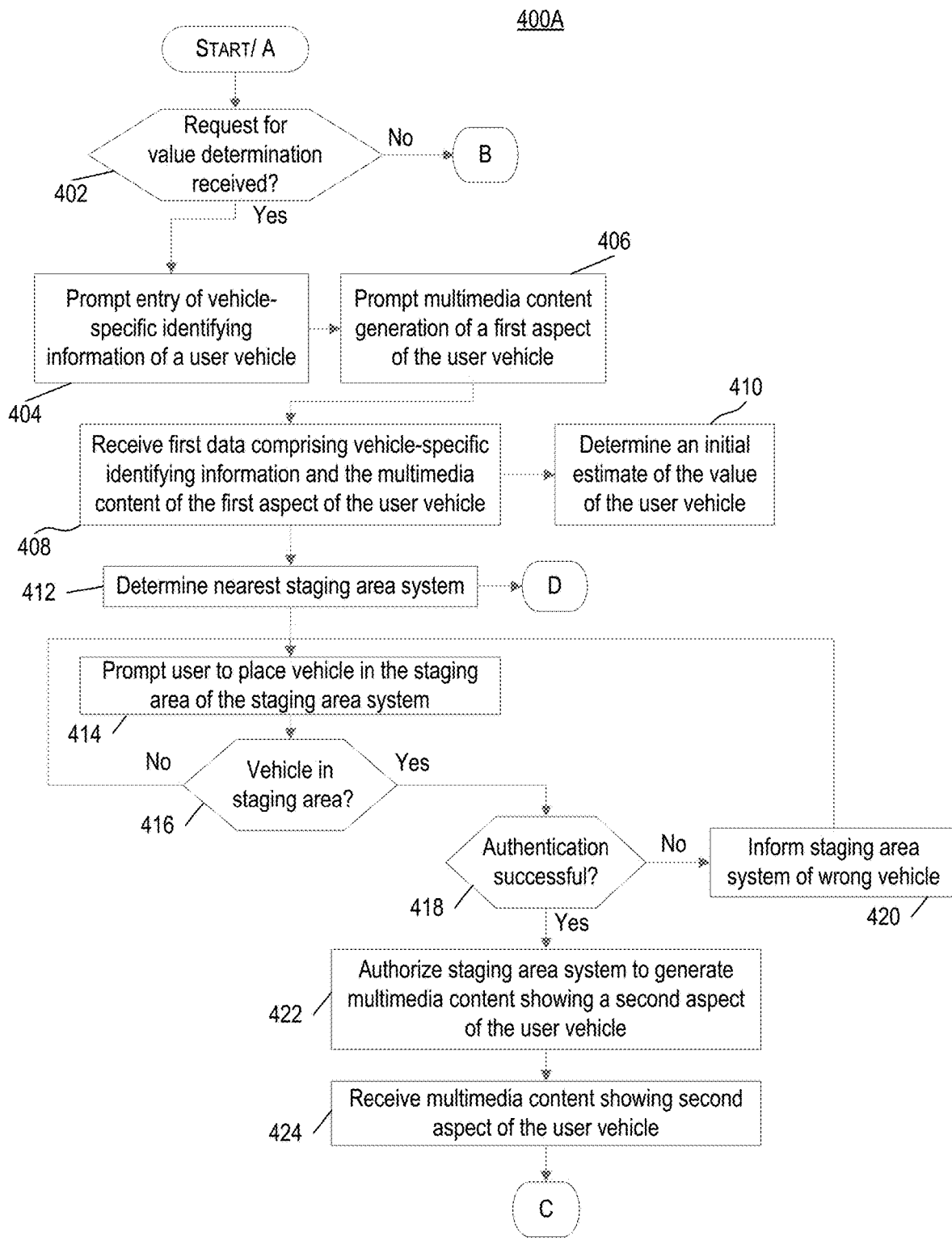
FIG. 4A-4B depict flow diagrams of example methods performed by the server for facilitating an automated trade-in of vehicles with limited human interaction, in accordance with one or more illustrative aspects discussed herein.
Figure 4B:
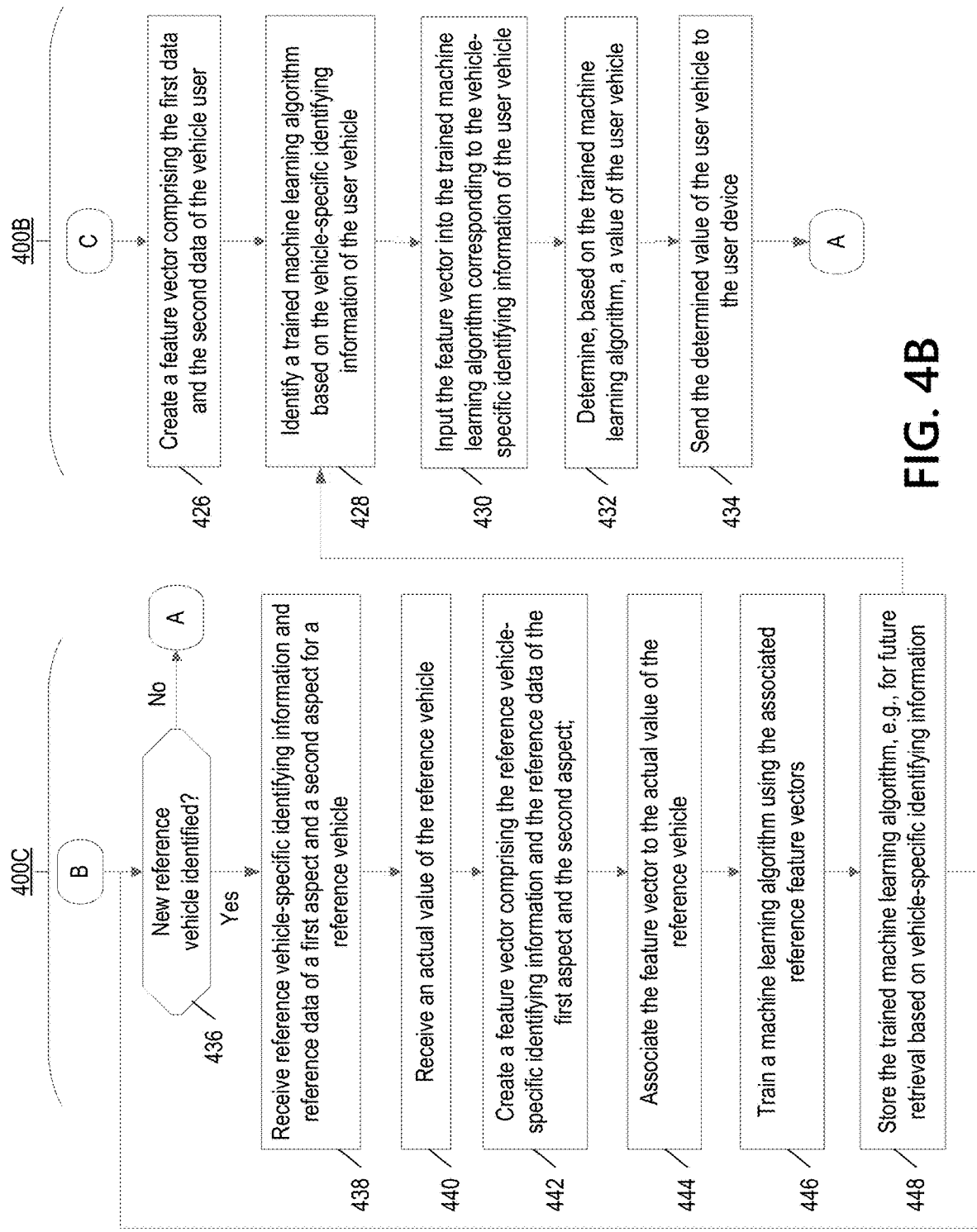
Figure 5:
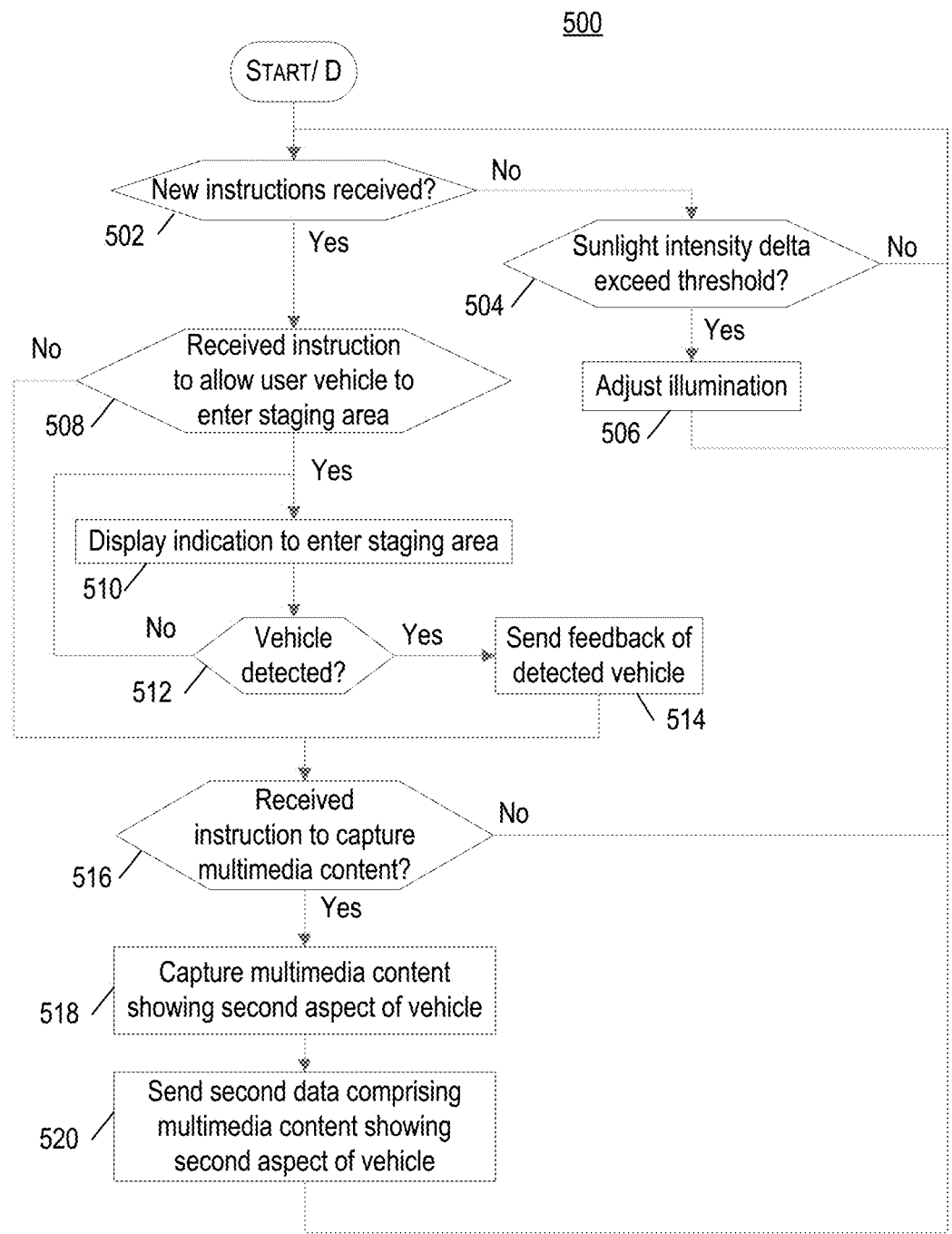
FIG. 5 depicts a flow diagram of an example method performed by a staging area system for facilitating an automated trade-in of vehicles with limited human interaction, in accordance with one or more illustrative aspects discussed herein.

FIGS. 4A-4B depict flow diagrams of example methods for facilitating an automated trade-in of vehicles with limited human interaction, in accordance with one or more illustrative aspects discussed herein. Specifically, FIGS. 4A-4B shows an example method 400 of which one or more steps or portions can be performed by a server or computing system tasked with facilitating the automated trade-in of vehicles with limited human interaction ("server") (e.g., computing device 101, server 234, server system 352). As will be explained further below, FIG. 5 shows an example method 500 of which one or more steps or portions can be performed by the staging area system (e.g., computing device 105, staging area system 220, staging area system 318). In some instances, method 400 may be performed by the server and/or the staging area system. With respect to example method 400, FIG. 4A shows a first portion of method 400 (method 400A) where the server may determine whether a request for an automated determination of a trade-in value has been received, and may process such a request by obtaining information from other systems (e.g., a mobile device and/or a staging area system). FIG. 4B shows a second portion of method 400 (method 400B) where the server may utilize a machine learning model or a prediction model to automatically determine the trade-in value for the vehicle. Furthermore, FIG. 4B also shows a method 400C of training such a machine learning algorithm or a prediction model based on reference training data.

Referring now to FIG. 4A, a server may begin method 400A by monitoring whether it has received any request for an automated trade-in value determination for a user vehicle 206, or monitoring for new reference vehicles to refine its prediction models (e.g., until an external event occurs). These above-described monitoring steps (i.e., monitoring operation(s)) may be performed as a cyclical process and/or as a background operation. It is contemplated that the server may be connected to external systems (e.g., mobile devices 302, vehicle systems 334, staging area systems 318, vehicle manufacturer and/or dealership systems, etc.) over a communication network 390 for such monitoring operations to occur.

Thus, in at least one exemplary monitoring operation, the server may determine whether it has received any request for an automated trade-in value determination for a user vehicle 206 (e.g., as in step 402). The request may be sent by a user (e.g., user 202) from a mobile device (e.g., the mobile device 302, such as by using the mobile application 316) The request may be an electronic message with metadata identifying and locating the mobile device sending the electronic message. If no request has been received, the monitoring operation may proceed to step 436, which, as will be explained further below, may include determining whether a new reference vehicle has been identified. If a new reference vehicle has been identified, information about the reference vehicle (e.g., vehicle-specific information, multimedia content, and market or trade-in values) may be added to the memory 121 for training or refining prediction models, as will be further explained below. In these routine operations, an external event (e.g., a received request for an automated trade-in value determination, or an identification of a new reference vehicle) may cause the server to proceed to another series of steps.

For example, if a request has been received, the server may prompt the user to enter vehicle-specific identifying information of the vehicle (e.g., the user vehicle 206) for which the user is requesting the trade-in value (e.g., as in step 404). The prompting may involve notifying the user through the mobile application (e.g., mobile application 316). For example, the mobile application may display data fields for the user to enter the vehicle-specific identifying information. These data fields may prompt the user to enter information through the user interface of the mobile application (e.g., user interface 314), for example, the make, manufacture, model, trim level, class, vehicle type, body style, color, or year of manufacture of the user vehicle. Furthermore, the data field may prompt the user to enter a vehicle identification, which can be provided by a vehicle identification number (VIN), or an alphanumerical nameplate identification.

The received request from the user may be logged into a database of the server (e.g., at the user profile database 356 of server 352). For example, the server may create a user profile based an identification of the mobile device from which the user sent the request (e.g., mobile device identification 357). Information subsequently received from the user via the mobile device may be linked to a user profile (e.g., user profile 356 via linking engine 376).

The server may prompt the user to generate multimedia content (e.g., photos, videos, etc.) of one or more aspects of the user vehicle ("first aspects") (e.g., as in 406) using the mobile device. The one or more aspects of the user vehicle may include, for example, an exterior region of the user vehicle, an interior region of the user vehicle, a damage to an exterior or interior region of the user vehicle, an engine condition, a performance of the vehicle, a brake condition, a sound of the vehicle, a vehicle accessory condition, a level of a dusting or a natural or artificial debris on the exterior region of the user vehicle, or a weather-related or environmental impact on the user vehicle, etc. The multimedia content may include, for example, an image, an audio recording, a video recording, and/or text. In some aspects, the user may be instructed to capture a specific aspect of the vehicle. For example, an instruction (e.g., appearing on the user interface display 314 of the mobile application 316) may prompt the user, for example, to upload a photo of the vehicle's dashboard, upload a photo of the vehicle's rear exterior, etc. In some implementations, the mobile application may activate the camera or other image sensor 308 of the mobile device. In further implementations, the mobile application may designate an area (e.g., on the user interface display 314) where the user is prompted to capture a photo or video of an aspect of the vehicle, such that the aspect fits or is within the designated area. The designated area may be overlaid with a label (e.g., "please upload a photo of the dashboard here). Also or alternatively, the user may voluntarily generate a multimedia content of an aspect of the user vehicle based on the choosing of the user. For example, the user may wish to submit a photo of a damage of the vehicle or of an upgrade that the user had rendered to the vehicle. The generated multimedia content may also include metadata indicating the time, date, and/or location of the generation.

For simplicity, the one or more aspects of the vehicle captured in multimedia content generated by the user may be referred to as "first aspect(s)." In contrast, one or more aspects of the vehicle captured in multimedia content generated by the staging area system in subsequent steps may be referred to as "second aspect(s)." Nevertheless, the "first aspects" may be at least partially duplicative of the "second aspects" of the vehicle. For example, the user may take a photo of a rear exterior of the vehicle after being prompted to do so at step 406. However, (e.g., in subsequent steps that will be explained further below) the staging area system may also take a photo (e.g., via cameras 224 and 226) of the rear exterior of the user vehicle after the user vehicle has been placed in the staging area 212A. In the described example, the first aspect and the second aspect are the same—the rear exterior of the vehicle.

At step 408, the server may receive the vehicle-specific identifying information of the vehicle and the multimedia content showing the first aspects of the vehicle. For simplicity, information received by the server from the mobile device after the prompting in steps 404 and 406 (e.g., the vehicle-specific identifying information and the multimedia content capturing the first aspect(s)) may be referred to as "first data." In contrast, multimedia content generated by the staging area system in subsequent steps capturing the "second aspect(s)" may be referred to as "second data." Nevertheless, the "first data" may overlap with the "second data," as one or more of the first aspects of the vehicle may also comprise, include, or otherwise overlap with one or more second aspects of the vehicle. The received first data may be stored at the server. For example, the vehicle-specific identifying information may be stored or mapped to a known vehicle profile (e.g., vehicle profile 358) in a vehicle profile database (e.g., vehicle profile database 358). Thus, if the received vehicle-specific identifying information indicates a TOYOTA as the make, COROLLA as the model, LE as the trim level, and 2018 as the year of manufacture, the server may look through the vehicle profile database for a vehicle profile corresponding to a 2018 TOYOTA COROLLA LE, and may link the vehicle profile (e.g., via linking engine 376) to the user profile of the user and any received multimedia content associated with the user vehicle. The received multimedia content may be stored in a database (e.g., multimedia content database 364). Thus, the multimedia content may be linked, e.g., via linking engine 376, to the user profile of the user that sent the request, and the vehicle profile of the vehicle, as explained above.

At step 410, the server may determine an initial estimate of the trade-in value of the vehicle. This initial estimate may be based on the received first data. For example, the server may initially obtain the original value of the vehicle from the vehicle profile database based on the vehicle profile of the vehicle. As explained above, the vehicle profile of the user vehicle can be determined using the received vehicle-specific identifying information. Using the original value of the vehicle, the server may determine appropriate increases or decreases based on the characteristics of the first aspect(s) captured by the multimedia content. The server may assign weights to specific aspects of the vehicle such that certain aspects (e.g., engine condition) may have a greater impact to a vehicle's value than other aspects (e.g., condition of a vehicle accessory). Furthermore, the server may rely on machine learning and prediction models described further below to determine the appropriate weights for the aspects of the vehicle. The server may present the initial estimate of the trade-in value of the vehicle to the user via the mobile application 316. The user may be given an option to obtain an additional determination of the trade-in value of the vehicle. The additional determination may rely on the staging area system, which may have the advantage of providing a more thorough and/or accurate determination than may be possible with a mobile device.

After providing the initial estimate, or as an alternative to determining the initial estimate, the server may determine a staging area that is nearest or most accessible to the user (e.g., as in step 412). For example, the server may use the location of the mobile device 204 to determine the nearest staging area by calculating distances to the locations of various staging area systems associated with staging areas. The location of the mobile device 204 may be obtained from the metadata of the request received, e.g., in step 402. Furthermore, a list of staging area systems and their locations may be stored and periodically updated in the staging area database 362. As will be explained further below in relation to FIG. 5, the staging area system associated with the nearest staging area may be instructed by the server to perform various steps of method 500 (e.g., as shown by marker "D"). After the nearest staging area (e.g., staging area 212A) has been determined, the server may prompt the user to place the user vehicle in the staging area associated with the staging area system (e.g., as in step 414). For example, the user may receive a notification at the mobile device (e.g., via the mobile application 316 of the mobile device 302) that instructs the user to drive the user vehicle to the location of the determined nearest staging area system and place the user vehicle in the corresponding staging area (e.g., staging area 212A). It is contemplated that the user may subsequently drive the vehicle to the nearest staging area and proceed to place the vehicle in the staging area.

At step 416, the server may determine whether a vehicle has entered the staging area (e.g., staging area 212A corresponding to the staging area system 220) determined as being the nearest to the mobile device. Further discussion of how a staging area system associated with a staging area receives instructions for, monitors, and reports whether a vehicle has entered a staging area may be found in method 500 as shown in FIG. 5. The determination may be based on feedback received from the staging area system associated with the staging area that the vehicle has entered the staging area. The feedback may be based on image sensors or motion detectors 214A at the staging area system detecting the presence or entry of the vehicle. If the vehicle is not in the staging area, the server may continue to prompt the user to place the vehicle in the staging area corresponding to the nearest staging area system. The entered vehicle may not necessarily be the user vehicle, however. Thus, if the server determines that a vehicle has entered the staging area, the server may authenticate the vehicle. Also or alternatively, the staging area system associated with the staging area may authenticate the vehicle. For example, a user driving the user vehicle into the staging area may be prompted to enter a passcode sent to the mobile device (e.g., mobile device 204) when the user was prompted to place the user vehicle in the staging area. The passcode may be entered at the staging area system, e.g., at a user interface or keypad adjacent to the staging area. If the passcode is correct, the entered vehicle may be authenticated as being the user vehicle. The staging area system and/or the server may authenticate the entered vehicle as being the user vehicle by image recognition of the entered vehicle. An image of the entered vehicle may be compared with images of vehicles belonging to the vehicle profile of the user vehicle. If the images match to a degree of similarity, the entered vehicle may be authenticated as being the user vehicle. In such and other scenarios, the server may be notified if the entered vehicle has been authenticated as indeed being the user vehicle. If the authentication is not successful, however, the server may inform the staging area system that a "wrong vehicle" has entered the corresponding staging area (e.g., as in step 420). The staging area system may prompt the driver of the wrong vehicle to remove the wrong vehicle from the staging area, e.g., by way of a display or warning sound. The user that had originally initiated the request may continue to be prompted to place the user vehicle into the staging area (e.g., staging area 212A).

At step 422, if the authentication is successful, the server may authorize the staging area system to generate multimedia content showing second aspect(s) of the vehicle. As explained previously, the "second aspects" need not be distinct from the "first aspects" of the vehicle. For example, if the user had previously submitted a photo of a rear exterior of the vehicle after being prompted to do so at step 406, the staging area system may also take a photo (e.g., via its cameras) of the rear exterior of the vehicle, but could also take photos of other aspects of the vehicle that were not captured previously by the user. The staging area system may generate the multimedia content through its one or more instruments, as described in FIG. 2. For example, cameras 224 and 226 placed at the side of the staging area 212A may capture side views of the user vehicle. Likewise, a camera hovering at the top of a staging area (not shown) may capture the top view of the user vehicle or could capture the dashboard of the user vehicle. Furthermore, the user may be prompted to perform various functions to the user vehicle in order to assist the staging area system in generating the appropriate multimedia content capturing the appropriate second aspects. For example, the user may be prompted to start its engine, press the gas pedal, activate blinkers or other lights or accessories, or perform other such functions. These functions may allow the staging area system to obtain audio recordings of the engine sound (e.g., via its audio recorder 228), or obtain videos, e.g., of blinkers or accessory movements. The various aspects of the vehicle described above are not comprehensive. After capturing the second data (e.g., characteristics of the second aspects of the vehicle captured through the generated multimedia content), the second data may be sent to the server, e.g., via communications module 230 over the network.

At step 424, the server may thus receive the second data (e.g., multimedia content generated by the staging area systems and showing the second aspect(s) of the user vehicle). The received multimedia content may be stored in a database (e.g., multimedia content database 364). Metadata associated with the multimedia content may indicate, for example: the aspect of the vehicle being captured; the time, date, or location of the multimedia content generation; the vehicle associated with the multimedia content; and/or the source of the multimedia content (e.g., staging area system or instrument). The stored multimedia content may be linked, e.g., via the linking engine 376, to the vehicle profile of the vehicle whose aspect the multimedia content captures, or to the user profile of the user associated with the vehicle. The received multimedia content from the staging area systems may be referred to as second data to distinguish from the first data that includes multimedia content received from the mobile device.

Having received the first data and second data, the server may begin its automated determination of the trade-in value of the vehicle (e.g., as shown by marker "C"). FIG. 4B depicts the second portion of method 400 (e.g., method 400B), of which one or more steps or portions of the method are directed to using machine learning and other predictions models to automatically determine the trade-in value of the user vehicle. Furthermore, one or more steps or portions of method 400C depicted in FIG. 4B may also be directed to the training of such machine learning or prediction models based on reference training data.

For example, at step 426, the server may create a feature vector comprising the first data (vehicle-specific identifying information and multimedia content generated by the mobile device) and the second data (multimedia content generated by the staging area systems). A feature vector may be a set of numerical features, e.g., first data, arranged as a mathematical vector, matrix, or the like. Thus, if the multimedia content were to comprise images of various aspects of the vehicle, the respective images for each aspect of the vehicle may be aggregated and digitized as image data. For example, images that the mobile device generated of the vehicle's rear exterior may be aggregated with the images that the staging area system took of the user vehicle's rear exterior. The feature vector may comprise image data for each aspect of the vehicle, and provide a variable or an initial value for the weight attributed to each aspect of the vehicle. In some aspects, features may be arranged as feature matrices in addition to or as an alternative to feature vectors.

The server may then identify a trained prediction model from a plurality of prediction models, based on the vehicle-specific identifying information of the user vehicle (e.g., as in step 428). The vehicle-specific identifying information provided by the user may be used to identify a vehicle profile, e.g., from the vehicle profile database 358, as previously explained, and the server may have stored trained prediction models corresponding to each vehicle profile or category of profiles. Steps 436-450, as will be explained further below, may depict an example process for training such prediction models. Examples of prediction models may include supervised machine learning algorithms that rely on a training dataset. Thus, prediction models may include, but are not limited to artificial and deep neural networks (including convolutional neural networks), image classification, multivariate regression, multilayer perceptrons, support vector machines, random forests, etc.

As will be explained further below, prediction models may be trained and stored for each vehicle profile or category of vehicle profiles. For example, there may be a prediction model for predicting the trade-in value for a 2018 TOYOTA CAMRY LE or a prediction model for predicting the trade-in value for just a 2018 TOYOTA. It is contemplated that in some aspects, the level of specificity of a vehicle profile may result in a more accurate prediction model. However, the availability of trained prediction models for a desired level of specificity of a vehicle profile may depend on the availability of reference information (e.g., available multimedia content, known market or trade-in values) on vehicles belonging to the desired level of specificity of the vehicle profile. For example, in order to build a prediction model that could accurately predict the trade-in value for a 2018 TOYOTA CAMRY LE, the training of the prediction model may rely on reference multimedia content (e.g., reference photos and videos) of a plurality of 2018 TOYOTA CAMRY LE vehicles and known market or trade-in values for each of the plurality of 2018 TOYOTA CAMRY LE vehicles. However, while there may be a sufficient quantity of reference multimedia content or known market or trade-in values for the 2018 TOYOTA vehicles, there may not necessarily be a sufficient quantity of reference multimedia content or known market or trade-in values for the 2018 TOYOTA CAMRY LE vehicles. In the described example, the server may not necessarily be able to generate an accurate prediction model for predicting the trade-in value for a 2018 TOYOTA CAMRY LE.

At step 430, the server may input the feature vector into the prediction model (identified in step 428). The prediction models may comprise supervised machine learning algorithms, which may be trained using training data comprising domain data and range data. The domain data may include multimedia content from a plurality of vehicles belonging to a vehicle profile or category of vehicle profile. The range data may include the trade-in value or market value for each of the plurality of vehicles. Thus, the prediction models may be based on learned relationships between the domain data (e.g., multimedia content of a one or more aspects of a vehicle) to the range data (e.g., the value of the vehicle). Inputting the feature vector may include applying the learned relationships. In some aspects, applying the learned relationships may involve assigning weights to various aspects of the vehicle to determine the trade-in value. Thus, at step 432, the server may determine, based on the trained prediction mode, the trade-in value of the user vehicle. The determined trade-in value may be sent to the mobile device of the user (e.g., as in step 436). For example, the determined trade-in value may be displayed on the mobile application. The various aspects of the vehicle and the characteristics of the aspects that contributed to the trade-in value may be displayed.

In some implementations, the initial estimate of the value of the vehicle (e.g., from step 410) may be used in the determination of the trade-in value of the vehicle at step 432. For example, the initial estimate may be used to assign preliminary weights or priors in the formation of the feature vector. Also or alternatively, the initial estimate and the first data comprising the multimedia content may be used as part of the training data for the vehicle profile of which the vehicle is a part of.

Referring now to method 400C also shown in FIG. 4B, one or more steps or portions of method 400C may be directed to the training of prediction models based on reference training data.

The prediction models may be stored, e.g., for subsequent identification or retrieval at step 428. Furthermore, method 400C may be performed by the server as part of routine operations if the server identifies or detects a new reference vehicle (e.g., as in step 436). The server may periodically update a database (e.g., database of vehicle profiles 358), for example, by receiving and saving reference information (e.g., multimedia content, values, etc.) of reference vehicles. This reference information may be manually entered into the server, or may be sent to the server via external systems (e.g., computing systems of manufacturers, dealerships, vehicle systems 334, etc.). A vehicle or reference vehicle may be deemed by the server to be "new" if there is no corresponding vehicle profile for it saved in a vehicle database (e.g., vehicle database 358). For example, if a vehicle manufacturer, such as TESLA, just launched a brand new model, the server may not have a record of a vehicle profile corresponding to TESLA's brand new model. Such information may be provided to the server by a computing system associated with TESLA or may be manually entered into the server. If no new reference vehicle has been identified or detected, the server may continue the previously described operations for monitoring any received requests (e.g., as in step 402).

If a new reference vehicle has been identified or detected, the server may receive reference vehicle-specific identifying information and multimedia content for one or more aspects of the reference vehicle (e.g., as in step 438). The reference vehicle-specific identifying information (which may comprise the same information as the vehicle-specific identifying information received from the mobile device 302 of the user 202 for the vehicle) may include information for one or more of the make, manufacture, model, trim level, class, vehicle type, body style, color, or year of manufacture of a vehicle. The reference vehicle-specific identifying information may be used to create or update a vehicle profile, or link information to a currently existing vehicle profile. The one or more aspects of the reference vehicle may include, for example, an exterior region of the user vehicle, an interior region of the user vehicle, a damage to an exterior or interior region of the user vehicle, an engine condition, a brake condition, a vehicle accessory condition, a dusting or a natural or artificial debris on the exterior region of the user vehicle, or a weather-related or environmental impact on the user vehicle, etc. Furthermore, the one or more aspects of the reference vehicle may correspond with, overlap, or include the first aspect and second aspect of the user vehicle.

The multimedia content may include, for example, an image, an audio recording, a video recording, and/or text. The server may also receive a market or trade-in value for the reference vehicle (e.g., as in step 440). It is contemplated that brand new vehicles, for which the server may not yet have a recorded vehicle profile for, may not necessarily have a trade-in value that is different from the market value. Nevertheless, the market value can be used to build prediction models that determine relationships between conditions of one or more aspects of a vehicle captured by multimedia content to the economic value of the vehicle.

At step 442, the server may create a feature vector comprising the reference vehicle-specific identifying information and the reference data of the one or more aspects. For example, if the multimedia content were to comprise images of various aspects of the reference vehicle, the respective images for each aspect of the reference vehicle may be aggregated and digitized as image data. The feature vector may comprise image data for each aspect of the reference vehicle, and provide a variable or an initial value for the weight attributed to each aspect of the vehicle. Other arrangements of the features as an alternative to or as an addition to, feature vectors may be used, e.g., feature matrices.

At step 444, the server may associate the feature vector to the actual value (e.g., economic, market, or trade-in value) of the vehicle. In the context of supervised machine learning and other prediction models, the domain data may comprise the feature vector, and range data may comprise the actual value of the reference vehicle. At step 446, the server may use the associated feature vectors to train a prediction model. Depending on the type of prediction model that is being trained, the training may involve one or more iterations of using various weights or testing various mathematical relations before a prediction model has been reached. The prediction model would be able to input a given feature vector have one or more aspects for a specific vehicle profile or category of profiles, and would be able to output a trade-in value. As previously discussed, the prediction models may include, but are not limited to artificial and deep neural networks (including convolutional neural networks), image classification, multivariate regression, multilayer perceptrons, support vector machines, random forests, etc. The trained prediction model may be stored, e.g., for future retrieval based on vehicle-specific identifying information (e.g., as in step 448). After training a prediction model for the reference vehicle, the server 352 may continue previously described monitoring operations (e.g. monitoring whether any new reference vehicles have been identified, as in step 436, or detecting vehicles as in step 436, or determining whether any requests have been received, as in step 402).

FIG. 5 shows an example method 500 performed by one or more staging area systems (e.g., staging area system 318) for facilitating an automated trade-in of vehicles with limited human interaction. As discussed previously, the staging area systems may comprise one or more instruments for generating content pertaining to a vehicle and sending such content to the server. Furthermore, the staging area systems may comprises one or more devices or computing systems receiving instructions from the server 352, directing the instruments to generate content based on the instructions, receiving such content from the instruments, and sending such content to the server. Each staging area system may be associated with one or more staging areas (e.g., staging areas 212A-212B) where a vehicle may be placed. For simplicity, a staging area system may refer to a central device or computing system (e.g., staging area system 220) at or near the associated staging areas (e.g., staging areas 212A-212B) that received data obtained from the various instruments of the staging areas (e.g., instruments 320). Also or alternatively, a staging area system may refer to any one or more of the instruments that might have the capacity to communicate with the server. It is contemplated that prior to performing method 500, the staging area system may be connected to the server (e.g., over communication network 390).

The staging area system may begin method 500 by running routine operations of monitoring whether it has received any new instructions from the server (e.g., as in step 502), and/or calibrating its instruments, e.g., based on sunlight or time of day. Thus, in one aspect, as shown in FIG. 5, if no new instructions are received, the staging area system may calibrate or continue to calibrate its instruments. For example, the staging area system may comprise a sensor that detects or measures changes in sunlight intensity (e.g., sunlight sensor 324), in order to provide the optimal illumination for cameras or other image sensors (e.g., cameras 322). Thus, at step 504, the staging area system (e.g., via its sunlight sensor 324) may determine whether the sunlight intensity delta has exceeded a predetermined threshold. At step 506, if the sunlight intensity delta has exceeded, the staging area system may adjust its illumination (e.g., via lights 332) of the staging area. The adjustment may involve increasing or decreasing the brightness of lamps that illuminate the staging area. By adjusting the illumination, the staging area system can ensure that multimedia content, such as images or videos that capture various aspects of a vehicle, remain reliable in accurately showing the characteristics of the various aspects despite fluctuating sunlight. Furthermore, if new instructions are received, the staging area system may begin operations for facilitating the automated trade-in value determination of a vehicle. In some aspects, steps involved with monitoring environmental cues and adjusting illumination may continue to occur as a background process, whether or not new instructions are received at step 502.

If new instructions are received from the server, the staging area system may determine what instructions have been received. For example, at step 508, the staging area system may determine whether it has received instruction to allow a vehicle to enter the staging area (e.g., staging area 212A associated with the staging area system 318). If not, or alternatively, the staging area system may determine, at step 516, whether it has received instruction to generate multimedia content. In some implementations, the determinations in steps 508 and 516 may be performed in parallel.

If the server has provided instructions to allow the vehicle to enter the staging area (e.g., staging area 212A), the staging area system may display an indication (e.g., indication 216) to enter the staging area at step 510. For example, the staging area system may cause the traffic signal system (e.g., traffic signal system 328) to display a text (e.g., "Go," "Enter," etc.) or a color signal (e.g., green) to indicate to a user to drive a vehicle into the staging area. The staging area system may also or subsequently determine, at step 512, whether it has detected a vehicle in the staging area. In some aspects, the indication to enter may continue to occur until a vehicle has been detected in the staging area (e.g., staging areas 212A-212B). The detection may occur by way of an image sensor (e.g., image sensors 214A-214B) that detects the presence of a large object (e.g., vehicle) on the staging area, a heat sensor that detects the heat of the vehicle, or a motion sensor that detects the entry of the vehicle.

Upon detection, the staging area system may send a signal or indicator (e.g., feedback) that a vehicle has been detected at step 514. In some aspects, the detected vehicle may be authenticated to be the user vehicle. Such aspects may involve having the user enter in a code, a biometric input, or other such mechanism to allow the server to validate the detected vehicle as being the user vehicle.

If staging area system has received an instruction the generate multimedia content, the staging area system 318, at step 518, may cause its instruments to capture multimedia content showing one or more aspects of the user vehicle 206 that is positioned at the staging area 212A-212B. The one or more aspects (e.g., second aspect(s)) captured by the multimedia content generated by the staging area system may or may not necessarily be the same as the first aspect(s) captured by the multimedia content generated by the mobile device. In some aspects, the server may directly cause one or more instruments to generate the multimedia content depending on the aspect of the vehicle that the server wishes to capture. For example, the server may directly cause a camera positioned above the vehicle to take a photo of the top exterior of the vehicle. At step 520, the generated multimedia content (e.g., second data) may be sent to the server, e.g., over a communications network (e.g., communications network 390 via the communications module 230). After sending the data, the vehicle may exit the staging area to allow the staging area system to perform the aforementioned functions again for other vehicles. In some aspects, the staging area system may display an indication to the user to exist the staging area (e.g., a textual display saying "please exit now"). As discussed previously, it is contemplated that one or more steps or portions of method 500 would be performed by the staging area system while the server performs method 400.

Figure 6:
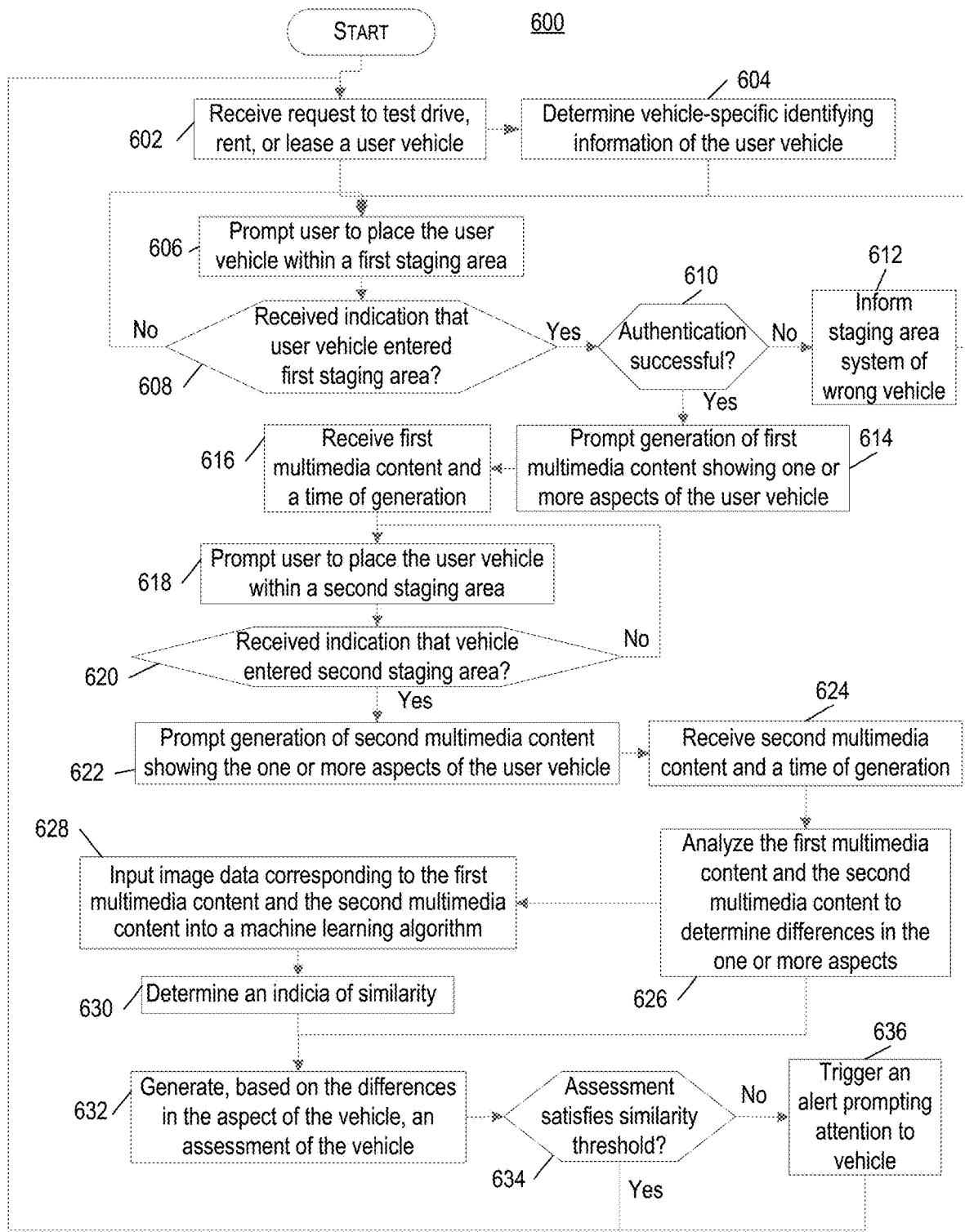
FIG. 6 depicts a flow diagram of an example method performed by a server for facilitating automated vehicle tracking for readiness with limited human interaction, in accordance with one or more illustrative aspects discussed herein.
Figure 7:
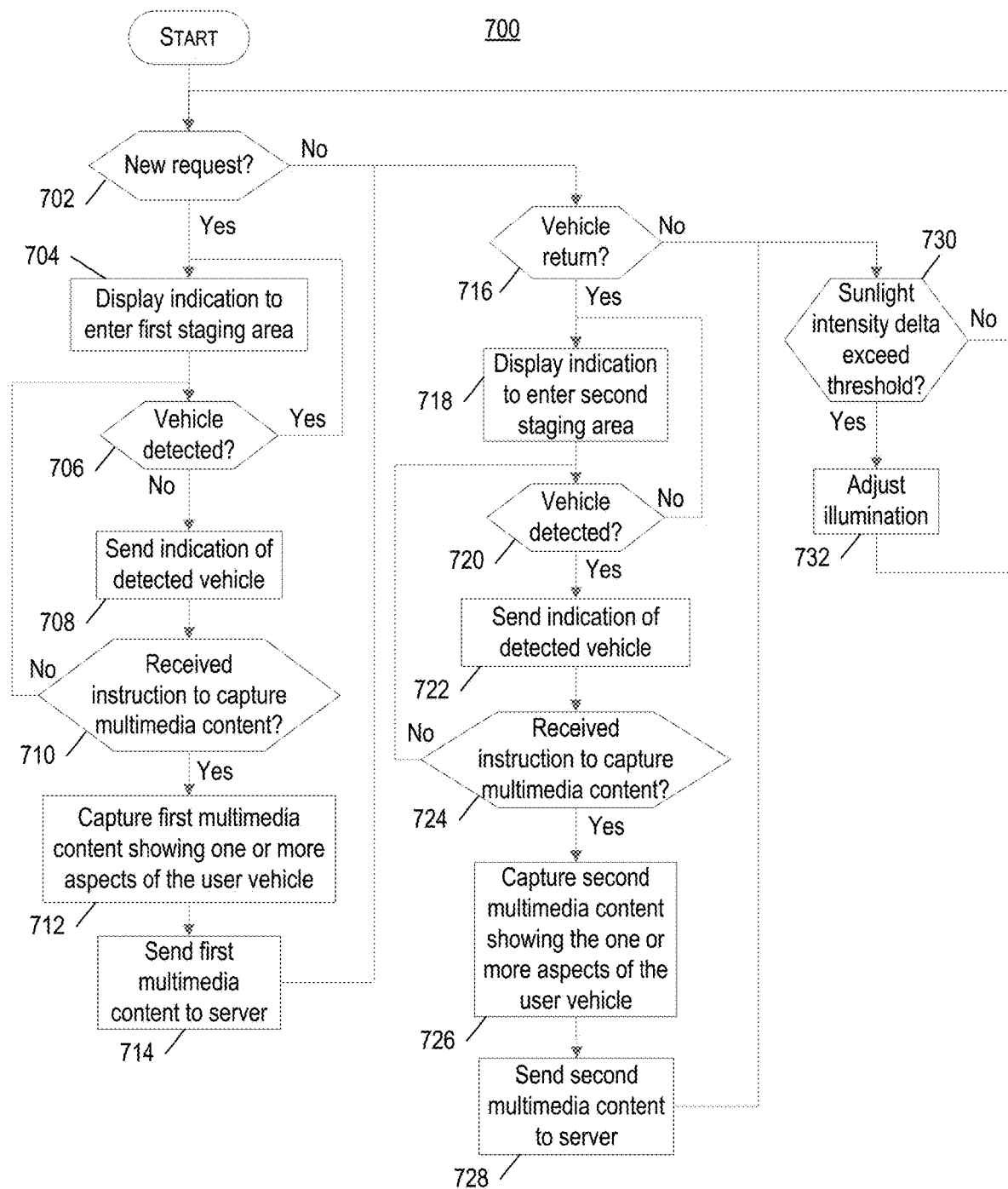
FIG. 7 depicts a flow diagram of an example method performed by a staging area system for facilitating automated vehicle tracking for readiness with limited human interaction, in accordance with one or more illustrative aspects discussed herein.

FIG. 6 depicts a flow diagram of an example method 600 for tracking readiness of vehicles (e.g., for test-drive, rental use, lease, etc.) with limited human interaction, in accordance with one or more illustrative aspects discussed herein. Specifically, FIG. 6 shows an example method 600 of which one or more steps or portions can be performed by a server (e.g., computing device 101, server 202, server system 352, or other computing system) that tracks the readiness of vehicles with limited human interaction. As will be explained further below, FIG. 7 shows an example method 700 of which one or more steps or portions can be performed by a staging area system (e.g., (e.g., computing device 105, staging area system 220, staging area system 318)). One or more steps or portions of method 600 may be performed by the server simultaneously as one or more steps or portions of method 700 are being performed by the staging area system.

Referring now to FIG. 6, the server may begin method 600 by receiving a request to test-drive, rent, and/or lease a vehicle (e.g., user vehicle 206). It is contemplated that the server may be connected to external systems (e.g., mobile devices 302, vehicle systems 334, staging area systems 318, vehicle manufacturer and/or dealership systems, etc.) over a communications network (e.g., communication network 390) for such routine monitoring operations to occur. The request may be received from a mobile device (e.g., the mobile device 302 of user 202). As explained previously, the mobile application (e.g., readiness tracker 370) of the user's mobile device may be a medium through which communications between the user and the server may take place. The request may be an electronic message with metadata identifying and locating the mobile device sending the electronic message. In some aspects, the request may include vehicle-specific identifying information of the vehicle (e.g., vehicle 206). For example, the request may include a VIN, nameplate, label, inventory information, or other identification of the vehicle. The server may use such vehicle-specific identifying information to retrieve and/or determine additional vehicle-specific identifying information of the vehicle (e.g., make, model, class, type, trim level, body style, color, year of manufacture, etc.) requested for test-drive, rental use, and/or lease. In other aspects, the user may be prompted (e.g., via the mobile application 316) to supply vehicle-specific identifying information. Thus, the server may determine vehicle-specific identifying information of the vehicle (e.g., as in step 604).

At step 606, the user may be prompted to place the vehicle within a staging area (e.g., staging area 212A). For example, the server may use the location of the mobile device to determine a staging area system (e.g., staging area system 220) that is closest to the mobile device. The server may calculate distances between the locations of various staging area systems and the mobile device, and pick the staging area system based on the shortest distance. The location of the mobile device may be obtained from the metadata of the request received, e.g., in step 602. For example, metadata comprising the location of the mobile device may be obtained via location sensors 306 on the mobile device 302. Furthermore, a list of staging area systems and their locations may be stored and periodically updated in a database (e.g., the staging area database 362). Thus, after the nearest staging area (e.g., staging area 212A) has been determined, the server may prompt the user to place the vehicle in the staging area associated with the staging area system (e.g., as in step 606). For example, the user may receive a notification at the mobile device (e.g., via mobile application 316) that instructs the user to drive the vehicle to the location of the determined nearest staging area system and place the vehicle in the corresponding staging area (e.g., staging area 212A). It is contemplated that the user may subsequently drive the vehicle to the nearest staging area system and proceed to place the vehicle in the staging area associated with the nearest staging area system to begin test drive or initiate a rental use or lease of the vehicle. In some aspects, the staging area that the user drives the vehicle prior to a test drive, rental use, or lease (e.g., staging area 212A) may be different from the staging area that the user drives the vehicle to at the end of the test drive, rental use, or lease (e.g., staging area 212B). For simplicity, "first staging area" (e.g., staging area 212A) may be used to refer to the former whereas "second staging area" (e.g., staging area 212B) may be used to refer to the latter. Nevertheless, in one or more aspects, the first staging area may comprise or be the same as the second staging area. Furthermore, in some aspects, the first staging area and the second staging area may be associated with the same staging area system (e.g., staging area system 220, as shown in FIG. 2).

Subsequently, the server may determine whether the vehicle has entered the first staging area (e.g., staging area 212A corresponding to the staging area system 220). This may involve determining whether the server has received an indication that the vehicle entered the first staging area (e.g., as in step 608). Further discussion of how a staging area system associated with one or more staging areas receives instructions for, monitors, and reports whether a vehicle has entered the one or more staging areas may be found in method 700 as shown in FIG. 7. The feedback may be based on image sensors or motion detectors at the first staging area detecting the presence or entry of the vehicle (e.g., as in sensor 214A). If the vehicle is not in the first staging area, the server may continue to prompt the user to place the vehicle in the first staging area. The entered vehicle may not necessarily be the user vehicle, however. Thus, if the server determines that a vehicle has entered the first staging area, the server and/or the staging area system may authenticate the vehicle in step 610. For example, a user driving the vehicle into the first staging area may be prompted to enter a passcode sent to the mobile device (e.g., mobile device 204) when the user was prompted to place the user vehicle in the first staging area. The passcode may be entered at the staging area system, e.g., at a user interface or keypad adjacent to the staging area. If the passcode is correct, the entered vehicle may be authenticated as being the user vehicle. The staging area system and/or the server may authenticate the entered vehicle as being the user vehicle by image recognition of the entered vehicle. For example, each vehicle designated for a test drive, rental use, or lease may have a QR code affixed to it that may be scanned by an image sensor of the staging area system to ensure that the entered vehicle is the correct vehicle requested for test-drive, rental use, or lease. In such and other scenarios, the server may be notified if the entered vehicle has been authenticated as indeed being the user vehicle. If the authentication is not successful, however, the server may inform the staging area system, at step 612, that a "wrong vehicle" has entered the corresponding staging area.

At step 614, if the authentication is successful, the server may authorize or prompt the staging area system to generate multimedia content showing one or more aspects of the user vehicle prior to the test-drive, rental use period, or lease period. As will be explained further below, after the test-drive period, rental use period, or lease period, the staging area system may again be authorized or prompted to generate multimedia content of the one or more aspects of the vehicle. For simplicity and clarity, "first multimedia content" may refer to the generated multimedia content before the test-drive, rental use, or lease, and "second multimedia content" may refer to the generated multimedia content after the test drive, rental use, or lease. In some aspects, the prompting or authorizing of the staging area system to generate the first multimedia content may involve identifying the one or more aspects of the vehicle for which multimedia content is requested.

After being prompted or authorized to generate the first multimedia content at step 614, the staging area system may proceed to generate multimedia content as will be explained in method 700 shown in FIG. 7. It is contemplated that the one or more aspects for which the first multimedia content is taken may overlap or may be the same one or more aspects of the vehicle for which the second multimedia content will be taken (e.g., after the test drive, rental use, or lease). By using the same or overlapping aspects of the vehicle, a reliable comparison can be made between the first multimedia content and the second multimedia content to track the readiness of the vehicle.

The staging area system may generate multimedia content, e.g., by directing instruments 320 to obtain images (e.g., via its cameras 224 and 226) of one or more aspects the vehicle. The staging area system may generate the multimedia content through its one or more instruments 320, as described in FIG. 2. For example, cameras 224 and 226 placed at the side of the staging area may capture side views of the user vehicle. Likewise, a camera hovering at the top of a staging area may capture the top view of the vehicle or could capture the dashboard of the vehicle. Furthermore, the user may be prompted to perform various functions to the vehicle in order to assist the staging area system in generating the appropriate multimedia content capturing the appropriate one or more aspects. For example, the user may be prompted to start its engine, press the gas pedal, activate blinkers or other lights or accessories, or perform other such functions. These functions may allow the staging area system to obtain audio recordings of the engine sound (e.g., via its audio recorder), or obtain videos, e.g., of blinkers or accessory movements. The various aspects of the vehicle described above are not comprehensive.

At step 616, the generated first multimedia content may be sent to, and received by, the server, e.g., via communications module 230 over the communications network 390. The received first multimedia content may be stored in a database (e.g., multimedia content database 364). Metadata associated with the multimedia content may indicate, for example: the aspect of the vehicle being captured; the time, date, or location of the multimedia content generation; the vehicle associated with the multimedia content; the user profile or ID of the user test-driving the vehicle, and/or the source of the multimedia content (e.g., staging area system or instrument). Thus, the server may also receive, among other data, a time of the generation of the first multimedia content, at step 616. The stored first multimedia content may be linked (e.g., via the linking engine 376) to the vehicle profile of the vehicle whose aspect the multimedia content captures, or to the user profile of the user associated with the vehicle. The stored first multimedia content may eventually be linked to the second multimedia content to be received after the test drive, rental use, or lease, as will be explained further below.

It is contemplated that once the first multimedia content has been generated and sent to the server, the user may proceed to test drive the vehicle or initiate the rental use or lease of the vehicle. The staging area system may indicate to the user, e.g., via a display or the traffic signal system 328, to exit the staging area to begin the test drive. In some aspects, the server may inform the user (e.g., via mobile application 316) of the duration or remaining time for the test drive, rental use period, or lease period. Furthermore, the user can also indicate (e.g., via an input into the mobile application 316) an intent to end a test drive session, rental use period, or lease period.

At step 618, the server may prompt the user to place the vehicle within a second staging area (e.g., staging area 212B) after the test drive, rental use, or lease. For example, mobile application 316 (e.g., readiness tracker 370) may remind the user during the test drive, rental use period, or lease period to return the user vehicle after the test drive, rental use period, and/or lease period to the second staging area. In some aspects, the server may guide the vehicle to the second staging area, for example, using location sensor 306 in the mobile device 302 or a GPS device 342 the vehicle to navigate. In some aspects, the user may be prompted to return the vehicle to the second staging area after the user has indicated an end to the test-drive session, rental use period, or lease period (e.g., via mobile application 316). It is contemplated that after this prompting, the user may drive the vehicle and park it within the second staging area to end test-drive, rental use, or lease. As discussed above, the second staging area (e.g., staging area 212B) may or may not be the same as the first staging area (e.g., staging area 212A). Furthermore, the first staging area and the second staging area need not be associated with the same staging area system.

Subsequently, the server may determine whether the vehicle has entered the second staging area. This may involve determining whether the server has received an indication that the vehicle entered the second staging area (e.g., as in step 620). As will be discussed in conjunction with method 700 shown in FIG. 7, the determination may be based on feedback received from the staging area system 318 that the vehicle has entered the second staging area. The feedback may be based on image sensors or motion detectors at the staging area system detecting the presence or entry of the vehicle (e.g., as in sensor 214B). If the vehicle is not in the second staging area, the server may continue to prompt the user to place the vehicle in the second staging area.

In some implementations, the returning vehicle may also be subjected to an authentication process, as discussed in steps 610 and 612, to ensure that a vehicle that entered the second staging area is indeed the user vehicle returning after the test-drive, rental use, or lease. In such implementations, if an authentication is not successful, the server may inform the staging area system that a "wrong vehicle" has entered the corresponding staging area.

At step 622, the server may authorize or prompt the staging area system associated with the second staging area to generate second multimedia content showing one or more aspects of the vehicle. The one or more aspects of the vehicle captured by the second multimedia content at step 622 may be the same as or may overlap with the one or more aspects of the vehicle captured by the first multimedia content prior to the test-drive, rental use, or lease. For example, if the first multimedia content comprised images of the user vehicle's top exterior, rear exterior, side exterior, and front exterior before the test-drive, rental use, or lease, then the second multimedia content may also comprise images of the user vehicle's top exterior, rear exterior, side exterior, and front exterior after the test drive. In the described example, the top exterior, rear exterior, side exterior, and front exterior after the test-drive, rental use, or lease may be the one or more aspects of the user vehicle. In some aspects, the prompting or authorizing of the staging area system to generate the second multimedia content may involve identifying the one or more aspects of the user vehicle for which multimedia content is requested, and directing various instruments of the staging area system to generate multimedia content capturing the identified one or more aspects. The server may rely on a memory of the one or more aspects captured in the first multimedia content and received by the server at step 616. For example, the server may query the multimedia content database 364 to identify the one or more aspects captured in the first multimedia content.

After being prompted or authorized to generate the second multimedia content at step 622, the staging area system may proceed to generate multimedia content as will be explained in method 700 shown in FIG. 7. By using the same or overlapping aspects of the vehicle, a reliable comparison can be made between the first multimedia content and the second multimedia content to track the readiness of the vehicle (e.g., for a subsequent test-drive, a subsequent rental use, a subsequent lease, etc.).

At step 624, the generated second multimedia content may be sent to, and received by, the server (e.g., via communications module 230 over the communications network 390). The received second multimedia content may be stored in a database (e.g., multimedia content database 364). Metadata associated with the multimedia content may indicate, for example: the aspect of the vehicle being captured; the time, date, or location of the multimedia content generation; the vehicle associated with the multimedia content; the user profile or ID of the user test-driving the user vehicle; and/or the source of the multimedia content (e.g., staging area system or instrument). Thus, the server may also receive, among other data, a time of the generation of the second multimedia content, at step 624. The stored second multimedia content may be linked (e.g., via the linking engine 376) to the vehicle profile of the vehicle whose aspect the multimedia content captures, or to the user profile of the user associated with the vehicle. Furthermore, the second multimedia content may also be linked (e.g., via linking engine 376) to the stored first multimedia content received prior to the test-drive, rental use, or lease. By linking the first multimedia content and the second multimedia content, one or more processors (e.g., processor 111) may be able to efficiently analyze the one or more aspects of the vehicle to assess the readiness of the returned vehicle.

Thus, at step 626, the server may analyze the first multimedia content and the second multimedia content to determine differences in the one or more aspects of the vehicle.

In at least one implementation, at step 628, the server may input image data corresponding to the first multimedia content ("first image data") and image data corresponding to second multimedia content ("second image data") into a machine learning model. Additional information (e.g., time of the generation of the respective multimedia content) may also be inputted into the machine learning model to better track the one or more aspects. For example, it is contemplated that if second multimedia content was generated after a significantly longer time from the generation of the first multimedia content, the one or more aspects captured by the first and second multimedia content may show a greater different, change, wear, or degradation. In some aspects, step 628 may involve initially identifying, from a plurality of machine learning models, a machine learning model corresponding to the vehicle-specific identifying information of the user vehicle. The vehicle-specific identifying information may be used to identify a vehicle profile from a database (e.g., vehicle profile database 358). The server may have stored trained prediction models corresponding to each vehicle profile or category of profiles. At step 630, the machine learning model may be used to determine an indicia of similarity between the first image data and the second image data. The indicia of similarity may be a quantitative metric that measures how similar or how different two separately generated multimedia content are in describing the same aspect of a vehicle.

In a further implementation, analyzing the first multimedia content and the second multimedia content through the machine learning model may involve forming input feature vectors. For example, the server may create a first input vector comprising first image data corresponding to the first multimedia content, and a second input vector comprising second image data corresponding to the second multimedia content. A first set of weights may be applied to the first input vector and a second set of weights may be applied to the second input vector. The values of the weights may change through the machine learning process. An artificial neural network may be used to generate an output vector to indicating an indicia of similarity between the first multimedia content and the second multimedia content.

Based on the differences between the first multimedia content and the second multimedia content for each of the one or more aspects of the user vehicle, the server may generate an assessment of the readiness of the user vehicle in step 632. In some implementations, the assessment need not rely on machine learning algorithm (e.g., bypassing steps 628 and 630).

At step 634, the server may determine whether the assessment of the readiness satisfies a similarity threshold. If the assessment of the readiness does not satisfy the threshold, the server may trigger an alert prompting attention to the vehicle 206 at step 636. For example, this alert may be a notification sent to the user (e.g., on mobile application 316 of mobile device 302 of the user 202). Also or alternatively, the alert may be sent to a computing system associated with a vehicle manufacturer and/or dealership. The alert may inform the manufacturer and/or dealership to service the vehicle, e.g., to improve the vehicle's readiness.

FIG. 7 shows an example method 700 performed by a staging area system (e.g., staging area system 318) for tracking the readiness of vehicles (e.g., for test-drive, rental use, lease, etc.) with limited human interaction. As discussed previously, the staging area system may comprise one or more instruments for generating content pertaining to a vehicle and sending such content to the server. Furthermore, the staging area system may comprise one or more devices or computing systems receiving instructions from the server, directing the instruments to generate content based on the instructions, receiving such content from the instruments, and sending such content to the server. The staging area system may be associated with one or more staging areas (e.g., staging areas 212A-212B) where the vehicle may be placed. For simplicity, the staging area system may refer to a central device or computing system (e.g., staging area system 220 as shown in FIG. 2, and staging area system 318 as also shown in FIG. 3) at or near the staging area(s) that received data obtained from the various instruments of the staging areas (e.g., instruments 320). Also or alternatively, a staging area system may refer to any one or more of the instruments that might have the capacity to communicate with the server. It is contemplated that prior to performing method 700, the staging area system may be connected to the server (e.g., over communication network).

The staging area system may begin method 700 by running routine operations of monitoring for signals from the server and/or mobile device related to a test-drive, rental use, or lease of a vehicle (e.g., as in steps 702 and 716), and/or calibrating its instruments, e.g., based on sunlight or time of day. Thus, in one aspect, if no such signals are received, the staging area system may calibrate or continue to calibrate its instruments. For example, the staging area system may comprise a sensor that detects or measures changes in sunlight intensity (e.g., sunlight sensor 324), in order to provide the optimal illumination for cameras or other image sensors. Thus, at step 730, the staging area system (e.g., via its sunlight sensor 324) may determine whether the sunlight intensity delta has exceeded a predetermined threshold. The predetermined threshold may be a predefined number of detected lumens. If the sunlight intensity delta has exceeded the predetermined threshold, the staging area system, at step 732, may adjust its illumination of the associated staging areas. The adjustment may involve increasing or decreasing the brightness of lamps (e.g., lamps 220A-220B) that illuminate the associated staging areas. By adjusting the illumination, the staging area system may have the advantage of enabling multimedia content, such as images or videos that capture various aspects of a vehicle, to be more reliable for accurately showing the characteristics of the various aspects of the vehicle (e.g., despite fluctuating sunlight). For example, if a photo was taken of a vehicle before a test-drive at dawn, and a photo was taken of the vehicle after the test-drive at mid-day, a calibrated illumination of the staging areas may have the advantage of reducing any unwanted variables (e.g., image artifacts) caused by the mid-day sun. Removing the effects of the sun on the actual image would help in making a reliable comparison between multimedia content captured before and after a period for a test-drive, rental use, or lease. Further, if signals related to a test-drive, rental use, or lease are detected or received, the staging area system may begin operations for tracking the readiness vehicles. In some aspects, steps involved with monitoring environmental cues and adjusting illumination may continue to occur as a background process.

The signals may include an indication that a new test-drive, new rental use, or a new lease has been requested by the user or an indication that a test-drive, rental use period, or lease period is ending. The signals may be detected or received. The server may notify the staging area system of a new request, for example, if the staging area system is the nearest to the mobile device of the user that sent the request. The staging area system can also be notified of a new request if the staging area system is designated for the vehicle that is requested for the test-drive. For simplicity, it can be assumed that detecting or receiving an indication of a new request involves the staging area system 318, e.g., due to its proximity to the mobile device of the user or due to its association with the vehicle requested. In some aspects, the staging area system may routinely check the server to determine whether a new request (e.g., to test-drive, rent, or lease a vehicle) has been processed. Thus, at step 702, the staging area system may determine whether there is a new request, based on a signal received from the server and/or otherwise based on a communication with the server. If not, or alternatively, the staging area system may determine, in step 716, whether there is an indication that a test-drive, rental use period, or lease period is ending. In some implementations, the determinations in steps 702 and 716 may be performed in parallel.

If there is an indication of a new request, and the staging area system is associated with the request, the staging area system may display, in step 704, an indication to enter the staging area. For example, the staging area system may cause traffic signal system 328 to display a text (e.g., "Go," "Enter," etc.) or a color signal (e.g., green) to indicate to a user to drive vehicle 206 into the staging area 212A. It is also contemplated that the server may have provided instructions to the user (e.g., via mobile application 316) to enter the staging area associated with the staging area system (e.g., "first staging area"). As previously discussed, the first staging area (e.g., staging area 212A) may refer to the staging area that the user drives the vehicle prior to initiating a test-drive, a rental use, or a lease, whereas a second staging area (e.g., staging area 212B) may refer to the staging area that the user drives the vehicle to at the end of the test-drive, the rental use period, or the lease period. The first staging area may comprise or be the same as the second staging area. For simplicity, the staging area system described in method 700 (e.g., staging area system 220, as shown in FIG. 2) may be associated with both the first staging area (e.g., staging area 212A) and the second staging area (e.g., staging area 212B). In other aspects, multiple staging area systems may be associated with different staging areas that may service the same user vehicle.

The staging area system may also or subsequently determine, at step 706, whether it has detected a vehicle in the first staging area. In some aspects, the indication to enter may continue to occur until a vehicle has been detected in the first staging area. The detection may occur by way of image sensor 214A that detects the presence of a large object (e.g., vehicle) on the first staging area, a heat sensor that detects the heat of the vehicle, and/or a motion sensor that detects the entry of the vehicle.

Upon detection, the staging area system may send, at step 708, a signal or indicator (e.g., feedback) that a vehicle has been detected. In some aspects, the detected vehicle may be authenticated to be the user vehicle. Such aspects may involve having the user enter in a code, a biometric input, or other such mechanism to allow the server to validate the detected vehicle as being the user vehicle.

At step 710, the staging area system may determine whether it has received an authorization or an instruction to generate multimedia content capturing one or more aspects of the vehicle. The authorization may be dependent on a proper authentication of the detected vehicle. Instructions for generating multimedia content may describe what aspects of the vehicle to capture through the multimedia content and/or which instruments of the staging area system (e.g., cameras and other image sensors 322) to be used to generate the multimedia content. If the staging area system has received an instruction to generate multimedia content, the staging area system may cause its instruments to capture multimedia content showing one or more aspects of the vehicle that is positioned at the first staging area in step 712.

As will be explained further below, after the test drive, the rental use, or the lease, the staging area system may again generate multimedia content of the one or more aspects of the vehicle. For simplicity and clarity, "first multimedia content" may refer to the generated multimedia content before the test drive, rental use, or lease, and "second multimedia content" may refer to the generated multimedia content after the test drive, the rental use, or the lease. It is contemplated that the one or more aspects for which the first multimedia content is taken may be the same one or more aspects of the vehicle for which the second multimedia content will be taken (e.g., after the test drive, rental use, or lease). By capturing the same aspects of the vehicle in the first multimedia content and the second multimedia content, the server may be able to make a reliable assessment of the condition of the vehicle before and after the test-drive, the rental use period, or the lease period. Thus, the server may thereby track the readiness of the user vehicle 206, e.g., for a subsequent test-drive, rental use, or lease. At step 714, the generated first multimedia content may be sent to the server, e.g., over the communications network 390 via the communications module 230. The first multimedia content may also include metadata indicating the time of generation as well as the aspect of the vehicle that the multimedia content captures. The server may store the first multimedia content along with an indication of the aspects being captured by the first multimedia content, e.g., so that at least some of these same aspects can be captured by the second multimedia content to be generated after the test-drive, rental use, or lease.

After the staging area system sends the multimedia content, the vehicle may exit the first staging area. In some aspects, the staging area system may display an indication to the user to have the vehicle exit the staging area (e.g., via a textual display saying "please exit now") and/or to begin the test-drive, rental use, or lease (e.g., via a textual display saying "enjoy the ride"). The staging area system may then continue its routine operations of monitoring for signals related to test-drive, rental use, or lease, or adjusting illumination.

For example, at step 716, the staging area system may determine whether it has received or detected a signal that the vehicle is returning from a test-drive, a rental use, or a lease or that a test-drive, rental use period, or lease period is ending. The server may have determined that a staging area (e.g., second staging area) associated with the staging area system is the closest to the vehicle or otherwise associated with the vehicle, and may send thus send the signal to the staging area system. In some aspects, the vehicle associated with the ending of, or return from, the test-drive, the rental use, or the lease may have used a staging area ("first staging area") of a different staging area system.

If the staging area system determines that a vehicle is returning from, or ending, a test-drive, rental use, or lease, the staging area system may display, at step 718, an indication to enter the second staging area (e.g., staging area 212B). For example, the staging area system may cause traffic signal system 328 to display a text (e.g., "Go," "Enter," etc.) or a color signal (e.g., green) to indicate to a user to drive the vehicle into the second staging area (e.g., staging area 212B). As previously discussed, the staging area in which the user vehicle enters after the test-drive, rental use period, or lease period (e.g., staging area 212B) may not necessarily be the same as first staging area where user vehicle entered prior to the test-drive, the rental use period, or the lease period (e.g., staging area 212A). Thus, the staging area entered after the test dive may be referred to as the "second staging area" 212B for simplicity.

At step 720, the staging area system may also or subsequently determine whether it has detected a vehicle in the second staging area. In some aspects, the indication to enter may continue to occur until a vehicle has been detected in the second staging area. The detection may occur by way of an image sensor (e.g., sensor 214B) that detects the presence of a large object (e.g., vehicle) on the second staging area, a heat sensor that detects the heat of the vehicle, and/or a motion sensor that detects the entry of the vehicle.

Upon detection, the staging area system may send a signal or indicator (e.g., feedback) that a vehicle has been detected in step 722. In some aspects, the detected vehicle may be authenticated to be the vehicle. Such aspects may involve having the user enter in a code, a biometric input, or other such mechanism to allow the server to validate the detected vehicle as being the vehicle. The code may be entered into the mobile device (e.g., mobile device 204) or a device at the staging area system.

At step 724, the staging area system may determine whether it has received an authorization or an instruction to generate multimedia content capturing one or more aspects of the vehicle. The authorization may be dependent on a proper authentication of the detected vehicle. Instructions for generating multimedia content may be based on capturing the aspects of the vehicle that were also captured in the first multimedia content. If the staging area system has received an instruction to generate multimedia content, the staging area system may cause its instruments to generate multimedia content showing the one or more aspects of the vehicle 206 at step 726. As discussed previously, the multimedia content generated at step 726 may be referred to as second multimedia content to distinguish from the first multimedia content generated before the test-drive, the rental use period, or the lease period.

Also as discussed previously, the one or more aspects of the vehicle captured in the second multimedia content may be the same one or more aspects of the vehicle that the first multimedia content captured before the test-drive, rental use period, or lease period. By capturing the same aspects of the vehicle in the first multimedia content and the second multimedia content, the server can make a reliable assessment of the condition of the vehicle before and after the period for the test-drive, and may thereby track the readiness of the user vehicle. At step 728, the generated second multimedia content may be sent to the server, e.g., over the communications network 390 via the communications module 230. The second multimedia content may also include metadata indicating the time of generation as well as the aspect of the vehicle that the multimedia content captures. The server may store the second multimedia content along the time of the generation. The difference between the time of generation of the first multimedia content and the time of generation of the second multimedia content (e.g., the duration of the test-drive, rental use, or lease) may allow the server to better assess the readiness of the user vehicle. For example, a longer gap in time may explain a change, wear-and-tear, dustiness, deterioration, or damage of an aspect of a vehicle captured by the first and second multimedia content.

After the staging area system 318 sends the second multimedia content at step 728, the server may use the received first and second multimedia content, their respective metadata (e.g., time of generation), and vehicle-specific identifying information to perform method 600, as previously explained in relation to FIG. 6 to track the readiness of the vehicle. In some aspects, the vehicle may be deemed to be unready for a subsequent test drive, rental use, or lease. The user 202 may be notified via mobile application 316, e.g., for damages or questions, if significant differences are detected between the first and second multimedia content suggest a significant damage or deterioration in an aspect of the vehicle. Also or alternatively, the server 352 and/or staging system 318 may communicate with one or more external systems (e.g., auto dealership or manufacturer computing systems) if the vehicle is deemed to be unready for a subsequent test-drive, rental use, or lease. For example, a comparison between the first and second multimedia content may reveal dusting or debris build up over the duration of the test-drive, the rental use, or the lease. By contacting an external system, the vehicle may be repaired or washed, e.g., to make it ready for subsequent test-drives, rental uses, or leases.

The staging area system may then continue its routine operations of monitoring for signals related to a test-drive, a rental use, or a lease, or adjusting illumination. As discussed previously, it is contemplated that one or more of the aforementioned steps or portions of method 700 would be performed by the staging area system while the server performs method 600.

What is claimed is:

1. A system comprising:
    a first computing device comprising:
        one or more first processors; and
        a first memory storing first instructions that, when executed by the one or more first processors, cause the first computing device to:
            receive, from a mobile device, a request to begin a value determination of a vehicle;
            receive, from the mobile device, a first data comprising:
                vehicle-specific identifying information, and
                multimedia content showing a first aspect of the vehicle associated with a user;
            determine, based on a feedback from one or more image sensors of a second computing device, that the vehicle associated with the user is within a predetermined area;
            receive, from the one or more image sensors, second data comprising multimedia content showing a second aspect of the vehicle;
            create a feature vector comprising the first data and the second data;
            input the feature vector into a machine learning algorithm corresponding to the vehicle-specific identifying information of the vehicle; and
            determine, based on the machine learning algorithm, a value of the vehicle; and
    the second computing device comprising:
        the one or more image sensors;
        one or more second processors; and
        a second memory storing second instructions that, when executed by the one or more second processors, cause the second computing device to:
            detect, using the one or more image sensors, that the vehicle associated with the user is within the predetermined area;
            send, to the first computing device, the feedback that the vehicle associated with the user is within the predetermined area;
            capture, using the one or more image sensors, the multimedia content showing the second aspect of the vehicle; and
            send, to the first computing device, the second data comprising the multimedia content showing the second aspect of the vehicle.

2. The system of claim 1, wherein the first instructions, when executed by the one or more first processors, cause the first computing device to:
    after the receiving the first data, determine an initial estimate of the value of the vehicle associated with the user, and wherein the determined value of the vehicle associated with the user is further based on an adjustment of the initial estimate of the value of the vehicle associated with the user.

3. The system of claim 1, wherein the first instructions, when executed by the one or more first processors, cause the first computing device to:
    prior to the inputting the feature vector into the machine learning algorithm, identify the machine learning algorithm based on the vehicle-specific identifying information of the vehicle associated with the user.

4. The system of claim 1, wherein the first instructions, when executed by the one or more first processors, cause the first computing device to:
    prior to the inputting the feature vector into the machine learning algorithm, train the machine learning algorithm using reference vehicle-specific identifying information and reference data of one or more aspects of a plurality of reference vehicles that are not associated with the user.

5. The system of claim 4, wherein the training the machine learning algorithm further comprises:
    receiving, for each of the plurality of reference vehicles that are not associated with the user, reference vehicle-specific identifying information and reference data of one or more of the first aspect or the second aspect of a given reference vehicle of the plurality of reference vehicles;
    receiving, for each of the plurality of reference vehicles, an actual value of the given reference vehicle;
    creating, for each of the plurality of reference vehicles, a reference feature vector comprising the reference vehicle-specific identifying information and the reference data;
    associating, for each of the plurality of reference vehicles, the reference feature vector to the actual value of the given reference vehicle; and
    training the machine learning algorithm using the associated reference feature vectors to predict the value of the vehicle associated with the user based on the vehicle-specific identifying information of the vehicle, the first data, and the second data.

6. The system of claim 5, wherein the first instructions, when executed by the one or more first processors, cause the first computing device to:
    determine a predictability for each of the one or more aspects of the given reference vehicle for estimating the actual value of the reference vehicle; and
    assign, based on the determined predictability, a first weight to the first data and a second weight to the second data.

7. The system of claim 1, wherein the one or more image sensors are calibrated to produce the multimedia content based on a degree of illumination within the predetermined area or a time within a diurnal cycle.

8. The system of claim 1, wherein the first aspect comprises one or more of:
    an exterior region of the vehicle associated with the user,
    an interior region of the vehicle associated with the user,
    a damage to an exterior or interior region of the vehicle associated with the user,
    dusting of an exterior region of the vehicle associated with the user, or
    a weather-related or environmental impact on the vehicle associated with the user.

9. The system of claim 1, wherein the vehicle-specific identifying information comprises one or more of:
    a year of manufacture of the vehicle associated with the user,
    a make of the vehicle associated with the user,
    a model of the vehicle associated with the user,
    a class of the vehicle associated with the user,
    a vehicle type of the vehicle associated with the user,
    a color of the vehicle associated with the user, or
    a mileage of the vehicle associated with the user.

10. The system of claim 1, wherein the vehicle-specific identifying information comprises one or more of:
    a vehicle registration plate identification of the vehicle associated with the user,
    a vehicle identification number (VIN) associated with the vehicle associated with the user, or
    a driver license identification associated with the vehicle associated with the user.

11. The system of claim 1, wherein the first instructions, when executed by the one or more first processors, cause the first computing device to:
    prior to the determining that the vehicle associated with the user is within the predetermined area, send, to the mobile device, an indication comprising a request to place the vehicle associated with the user within the predetermined area; and
    prior to the receiving the first data, prompt the mobile device to send the first data.

12. A method comprising:
    receiving, from a mobile device, a request to begin a value determination of a vehicle associated with a user;
    receiving, from the mobile device, a first data comprising:
        vehicle-specific identifying information of the vehicle associated with the user,
    and
        multimedia content showing a first aspect of the vehicle associated with the user;
    determining, based on feedback from one or more image sensors, that the vehicle is within a predetermined area;
    receiving, from the one or more image sensors, second data comprising multimedia content showing a second aspect of the vehicle;
    creating a feature vector comprising the first data and the second data;
    inputting the feature vector into a machine learning algorithm corresponding to the vehicle-specific identifying information of the vehicle associated with the user;
    determining, using the machine learning algorithm, a value of the vehicle associated with the user based on the first data and the second data; and
    sending, to the mobile device, an indication of the determined value of the vehicle associated with the user.

13. The method of claim 12, further comprising:
    after the receiving the first data, determining an initial estimate of the value of the vehicle associated with the user, and wherein the determining the value of the vehicle is further based on an adjustment of the initial estimate of the value of the vehicle associated with the user.

14. The method of claim 12, further comprising:
    prior to the inputting the feature vector into the machine learning algorithm, identifying the machine learning algorithm based on the vehicle-specific identifying information of the vehicle associated with the user.

15. The method of claim 12, further comprising,
    prior to the inputting the feature vector into the machine learning algorithm, training the machine learning algorithm using reference vehicle-specific identifying information and reference data of one or more aspects of a plurality of reference vehicles that are not associated with the user.

16. The method of claim 15, wherein the training the machine learning algorithm further comprises:
receiving, for each of the plurality of reference vehicles that are not associated with the user, reference vehicle-specific identifying information and reference data of one or more of the first aspect of a given reference vehicle of the plurality of reference vehicles or the second aspect of the given reference vehicle of the plurality of reference vehicles;
receiving, for each of the plurality of reference vehicles, an actual value of the given reference vehicle;
creating, for each of the plurality of reference vehicles, a reference feature vector comprising the reference vehicle-specific identifying information and the reference data;
associating, for each of the plurality of reference vehicles, the reference feature vector to the actual value of the given reference vehicle; and
training the machine learning algorithm using the associated reference feature vectors to predict the value of the vehicle associated with the user based on the vehicle-specific identifying information of the vehicle, the first data, and the second data.

17. The method of claim 16, further comprising,
determining a predictability for each of the one or more aspects of the reference vehicle for estimating the actual value of the given reference vehicle; and
assigning, based on the determined predictability, a first weight to the first data and a second weight to the second data.

18. The method of claim 12, wherein the one or more image sensors are calibrated to produce the multimedia content based on a degree of illumination within the predetermined area or a time within a diurnal cycle.

19. The method of claim 12, further comprising:
prior to the determining that the vehicle associated with the user is within the predetermined area, sending, to the mobile device, an indication comprising a request to place the vehicle associated with the user within the predetermined area; and
prior to the receiving the first data, prompting the mobile device to send the first data.

20. One or more non-transitory media storing instructions that, when executed by one or more processors, cause the one or more processors to perform steps comprising:
receiving, from a mobile device, a request to begin a value determination of a vehicle associated with a user;
prompting the mobile device to send a first data comprising:
vehicle-specific identifying information of the vehicle associated with the user, and
multimedia content showing a first aspect of the vehicle associated with the user;
receiving, from the mobile device, the first data;
sending, to the mobile device, an indication comprising a request to place the vehicle associated with the user within a predetermined area
determining, based on feedback from one or more image sensors, that the vehicle associated with the user is within the predetermined area;
receiving, from the one or more image sensors, second data comprising multimedia content showing a second aspect of the vehicle associated with the user;
creating a feature vector comprising the first data and second data;
identifying a machine learning algorithm corresponding to the vehicle-specific identifying information of the vehicle associated with the user;
inputting the feature vector into the identified machine learning algorithm to determine a value of the vehicle associated with the user; and
sending, to the mobile device, an indication of the value of the vehicle associated with the user.

\* \* \* \* \*